US008368916B2

(12) United States Patent
Mizuno

(10) Patent No.: US 8,368,916 B2
(45) Date of Patent: Feb. 5, 2013

(54) DATA DISTRIBUTION PROCESSING SYSTEM, DATA DISTRIBUTION PROCESSING METHOD, AND PROGRAM FOR SECURE DATA TRANSFER BY SPLITTING DATA, GENERATING DUMMY DATA, AND RECONSTRUCTING DATA

(75) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1147 days.

(21) Appl. No.: 11/469,218

(22) Filed: Aug. 31, 2006

(65) Prior Publication Data
US 2007/0104007 A1 May 10, 2007

(30) Foreign Application Priority Data

Sep. 9, 2005 (JP) .................................. 2005-262981

(51) Int. Cl.
*G06F 3/12* (2006.01)
(52) U.S. Cl. . 358/1.15; 358/1.1; 365/221; 365/189.011; 365/73; 370/351
(58) Field of Classification Search .................. 365/221, 365/189.011, 73; 370/351; 358/1.15, 1.1
See application file for complete search history.

(56) References Cited

U.S. PATENT DOCUMENTS 5,293,319 A * 3/1994 DeSha et al. .................. 705/408
2005/0270565 A1 * 12/2005 Shima et al. .................. 358/1.15

FOREIGN PATENT DOCUMENTS

| JP | 2004252888 | * | 3/1994 |
| JP | 7-177277 A | | 7/1995 |
| JP | 02001067191 | * | 3/2001 |
| JP | 2002-032280 A | | 1/2002 |
| JP | 2002-040939 A | | 2/2002 |
| JP | 2004-118239 | | 4/2004 |
| JP | 2005161535 | * | 6/2005 |

OTHER PUBLICATIONS

Koike Takano, Digital Copying Machine, Apr. 15, 2004, JP 2004-118239.*

* cited by examiner

*Primary Examiner* — Benny Q Tieu
*Assistant Examiner* — Martin Mushambo
(74) *Attorney, Agent, or Firm* — Fitzpatrick, Cella, Harper & Scinto

(57) ABSTRACT

A first copier acquires data and determines a plurality of recipients to deliver split data. A data splitter 308 splits data into a plurality of data blocks and a dummy data generator 315 generates dummy data. A data delivery unit 310 delivers the data blocks and dummy data to the plurality of recipients. At the same time, the data delivery unit 310 outputs restoration information including information about the recipients of the data. Based on the restoration information, a second copier collects the plurality of data blocks and the dummy data from the plurality of recipients and discards the dummy data, acquiring the plurality of data blocks. The second copier reconstructs a set of data from the plurality of data blocks.

15 Claims, 28 Drawing Sheets

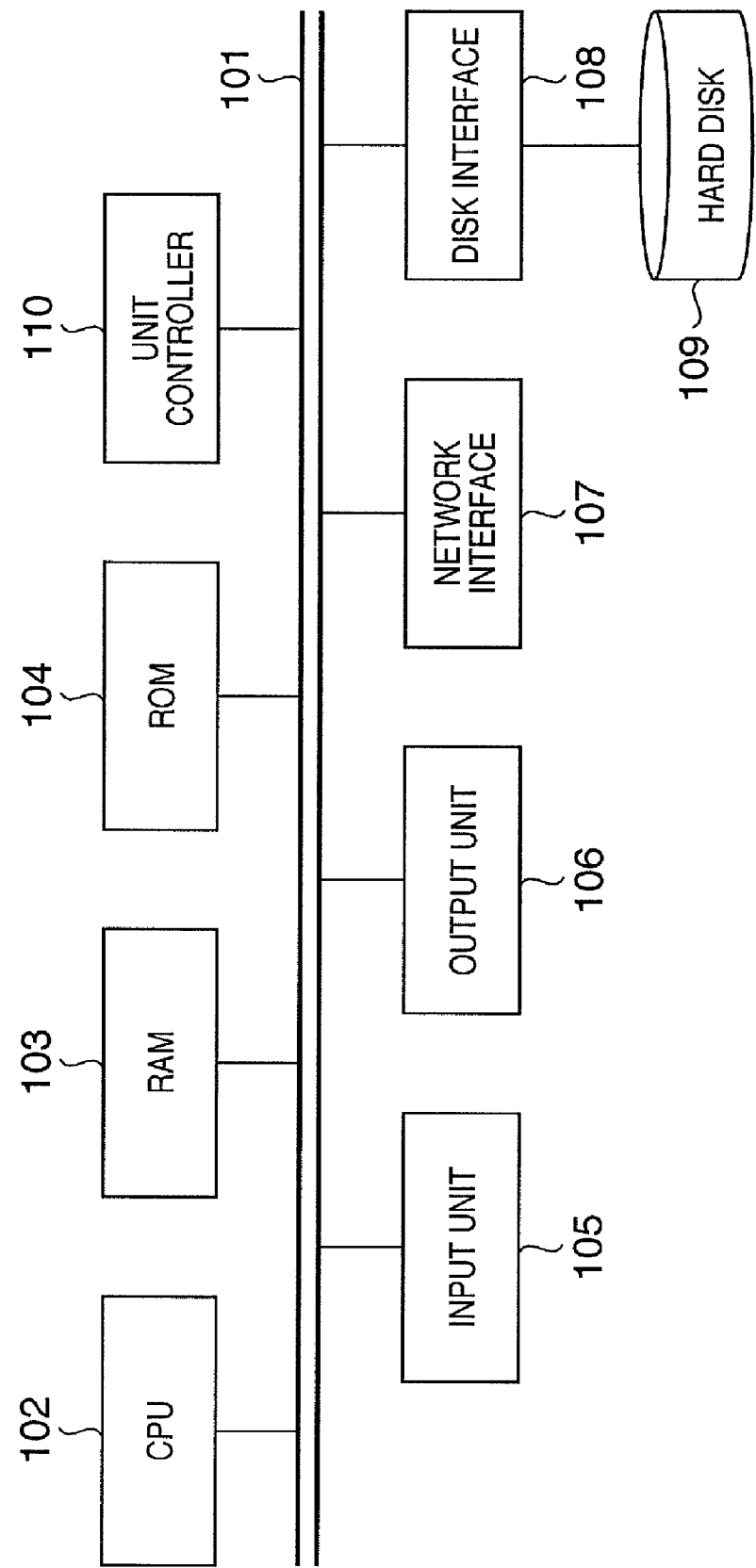

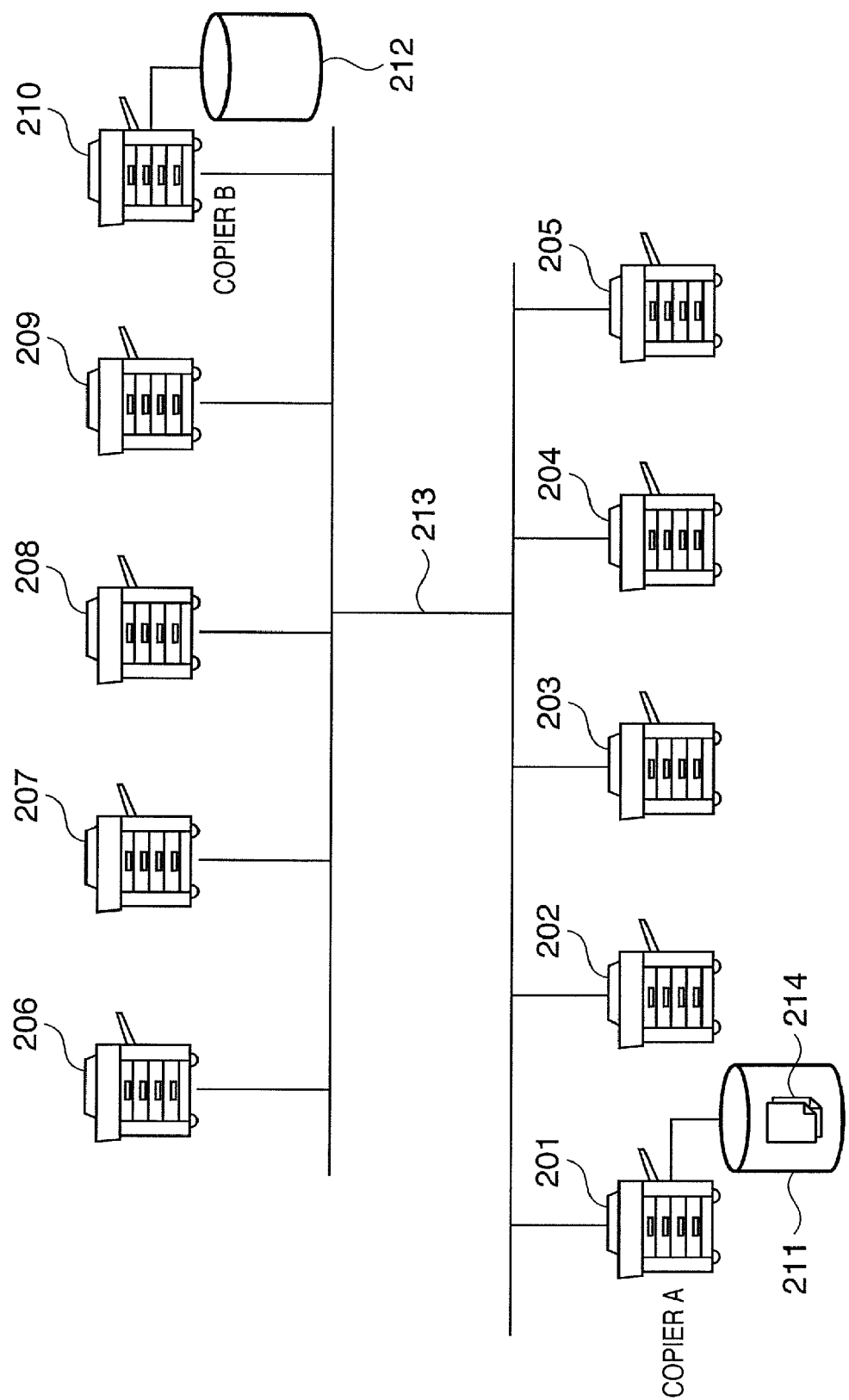

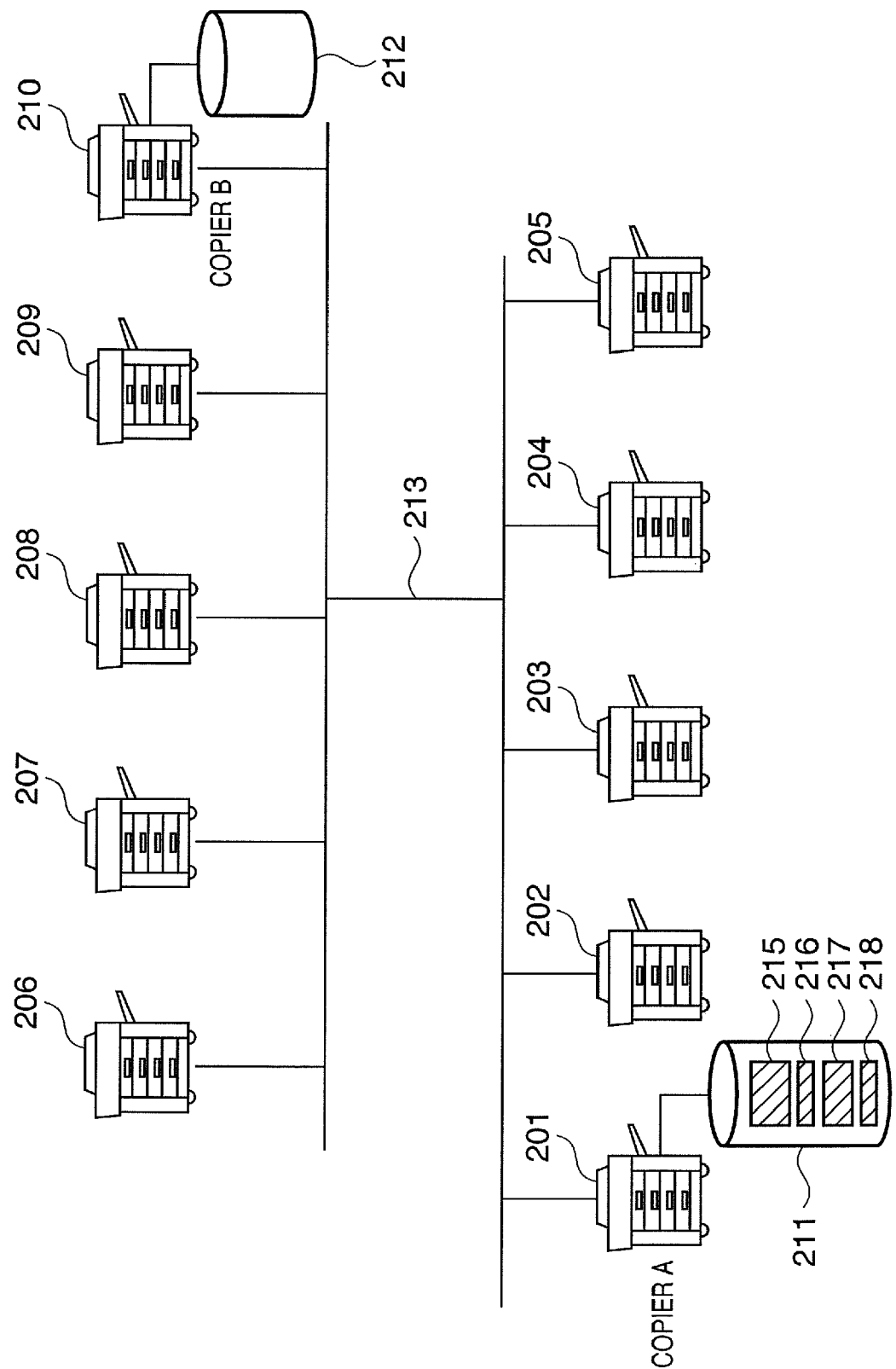

FIG. 4A
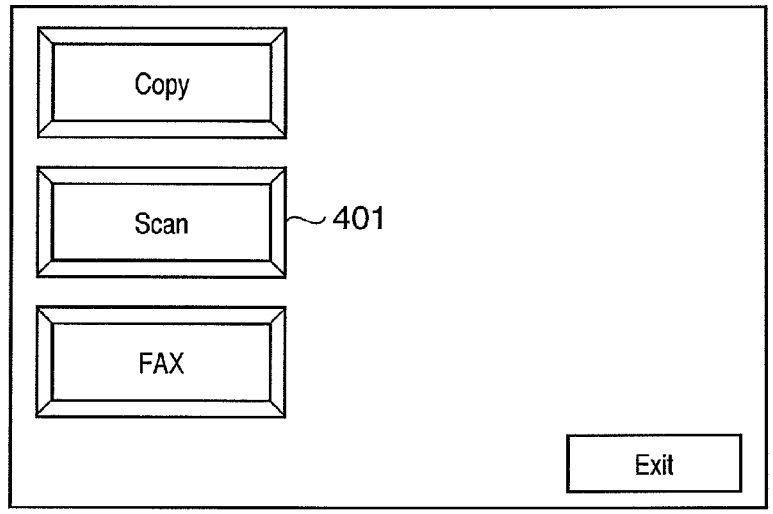
FIG. 4B
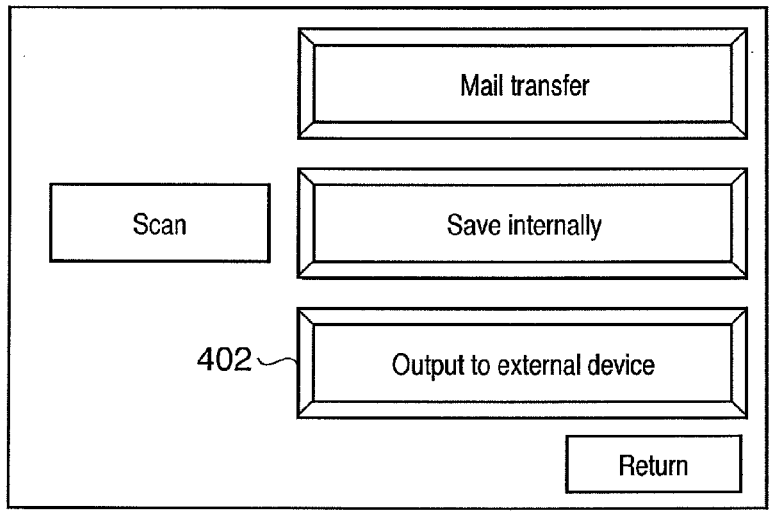
FIG. 4C
Output to external device
Output destination device :
403 ⬜ . ⬜ . ⬜ . ⬜ .
Output permission :
404 — Start time Yr ⬜ M ⬜ D ⬜ : ⬜
405 — End time Yr ⬜ M ⬜ D ⬜ : ⬜
406 — Start    Cancel

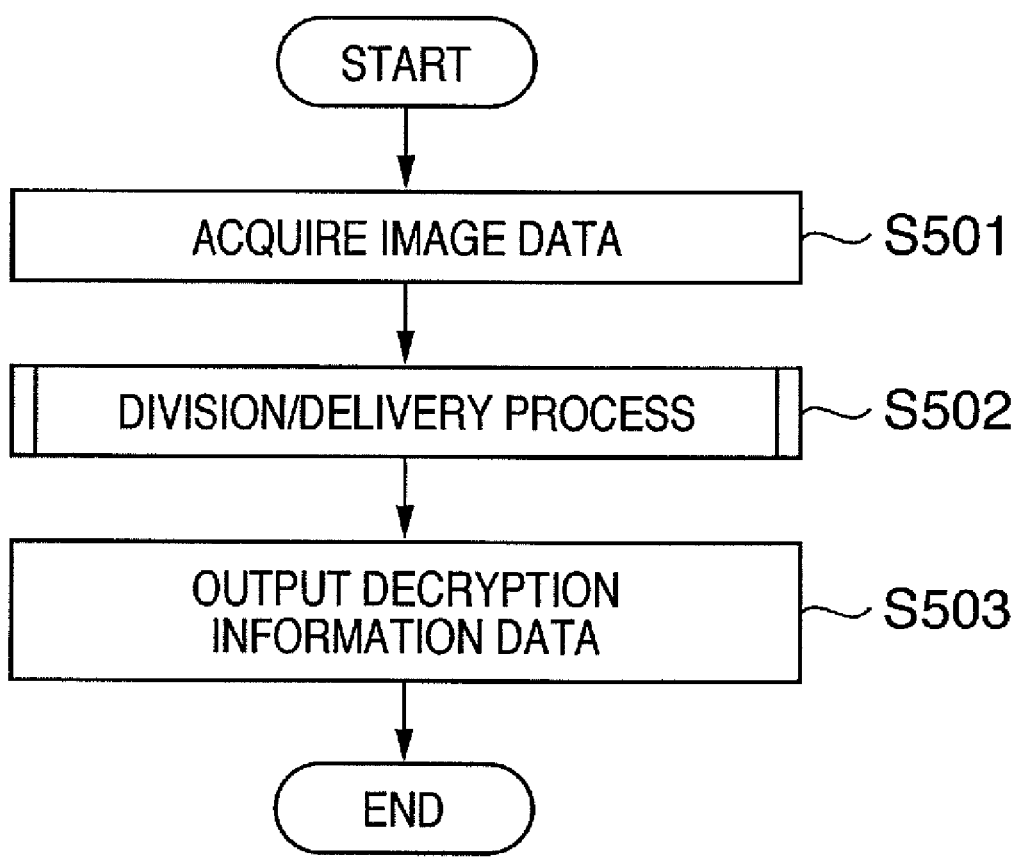

FIG. 13

1301 — output : 192.168.10.5
1302 — total : 4
1303 — { 1 : 192.168.2.3 : \userX\184251\xxxyy
2 : 192.168.2.121 : \userX\21438\opz
3 : 192.168.251.37 : \temp\usreX\98354
4 : 192.168.134.48 : \abc\xyz\opqr
1304 — from : 2005.06.01 : 9:00:00
1305 — to : 2005.06.01 : 17:00
1306 — number of reconstruction info : 5
1307 — id : 2

FIG. 20

```
1301 ～ output : 192.168.10.5
1302 ～ total : 4
         ⎧ 1 : 192.168.2.3 : \userX\184251\xxxyy;      ～ 2001
         ⎪     192.168.8.56 : \userX\18534535\abbde
         ⎪ 2 : 192.168.2.121 : \userX\21438\opz;       ～ 2002
1303 ⎨     192.168.120.88 : \userX\85675\hdyre
         ⎪ 3 : 192.168.251.37 : \temp\usreX\98354;     ～ 2003
         ⎪     192.168.73.37 : \userX\9597579\kgjkftjytu
         ⎪ 4 : 192.168.134.48 : \abc\xyz\opqr;         ～ 2004
         ⎩     192.168.244.1 : \zxxX\abc\texe
1304 ～ from : 2005.06.01 : 9:00:00
1305 ～ to : 2005.06.01 : 17:00
1306 ～ number of reconstruction info : 5
1307 ～ id : 2
```

DATA DISTRIBUTION PROCESSING SYSTEM, DATA DISTRIBUTION PROCESSING METHOD, AND PROGRAM FOR SECURE DATA TRANSFER BY SPLITTING DATA, GENERATING DUMMY DATA, AND RECONSTRUCTING DATA

BACKGROUND OF THE INVENTION

1. Field of the Invention

The present invention relates to a data distribution processing system, data distribution processing method, and program which split data into data blocks and distribute the data blocks to a plurality of devices connected to a network and then collect the data blocks to reconstruct the original data.

2. Description of the Related Art

With increases in functionality of copiers, recent copiers are equipped with a storage device such as a hard disk to temporarily hold images read by scanning paper documents and the like. Furthermore, the copiers are provided with networking functions to exchange data held in respective storage devices among themselves by being connected via a network.

An example of data exchange will be described by citing a system in which a plurality of copiers 201 to 210 are placed on a network 213 such as shown FIG. 2A. Generally, a document (original) scanned by copier A (201) is printed out by copier A (201).

A storage device such as a hard disk of a copier is used, for example, as follows. A document is scanned by copier A (201) and resulting image data 214 is stored on a hard disk or other storage device 211 of copier A (201). The image data 214 is acquired from the storage device 211 of copier A (201) by copier B (210) connected to the network 213. The acquired image data 214 is printed out by copier B (210).

Alternatively, when copier A (201) scans a document, the image data 214 read into the storage device 211 of copier A (201) may be transferred to a hard disk or other storage device 212 of copier B (210). In that case, copier B (210) produces printouts using the image data transferred and stored in the storage device 212.

It is assumed naturally that the copiers 201 to 210 perform appropriate authentication processes. Also, it is assumed that the copiers 201 to 210 are capable of identifying the image data stored in the storage device 211 or 212.

Due to increased security awareness, many companies and the like forbid taking notebook PCs, USB memories, or other external memories out of the companies or the like. Consequently, chances are increasing that documents (originals) scanned by a copier are outputted via an external network to which the copier is connected.

In view of this, security is enhanced by encrypting the data transferred between copiers.

Also, a method is known in which scanned images are stored in a distributed manner among storage devices of copiers connected to a network (see for example, Japanese Patent Laid-Open No. 2004-118239).

However, simple encryption of the data transferred between copiers is not enough to prevent malicious third parties from intercepting the data even if the entire data is encrypted. Also, encryption may be broken by advanced computer technologies or the like. Besides, since the entire data flows through the network, all the data may leak once it is deciphered.

The method described in the patent document above enhances security by managing data in a distributed manner. However, the method assumes that the data is restored on the scanning copier and it does not allow for secure output from other copiers and similar devices on the network.

SUMMARY OF THE INVENTION

An object of the present invention is to provide a data distribution processing system, data distribution processing method, and program which can make it extremely difficult for a third party to restore original data even if split data flowing through a network is intercepted by the third party during transmission or reception.

According to the present invention, the foregoing object is attained by providing a data distribution processing system equipped with a plurality of apparatus which are interconnected via a network and are capable of data communications, comprising: a first apparatus which comprises: a data acquisition unit adapted to acquire data, a determination unit adapted to determine a plurality of recipients for use to split and deliver the data, a splitting unit adapted to split the data into a plurality of data blocks, a generation unit adapted to generate dummy data, a delivery unit adapted to deliver the data blocks and dummy data to the plurality of recipients, and an output unit adapted to output restoration information including information about the recipients of the data; and a second apparatus which comprises: a collection unit adapted to collect the plurality of data blocks and dummy data from the plurality of recipients based on the restoration information, and a reconstruction unit adapted to reconstruct the data split by the splitting unit, using the plurality of data blocks out of the plurality of data blocks and the dummy data collected by the collection unit.

According to another aspect of the present invention, the foregoing object is attained by providing a data distribution processing method for a data distribution processing system equipped with a first and second apparatuses which are interconnected via a network and are capable of data communications, the method comprising, in the first apparatus, the steps of: acquiring data, determining a plurality of recipients for use to split and deliver the data, splitting the data into a plurality of data blocks, generating dummy data, delivering the data blocks and dummy data to the plurality of recipients, and outputting restoration information including information about the recipients of the data; and the method comprising, in the second apparatus, the steps of: collecting the plurality of data blocks and dummy data from the plurality of recipients based on the restoration information, and reconstructing the split data using the plurality of data blocks out of the collected plurality of data blocks and dummy data.

Further features of the present invention will be apparent from the following description of exemplary embodiments with reference to the attached drawings.

BRIEF DESCRIPTION OF THE DRAWINGS

FIG. 1 is a block diagram showing an example of a detailed configuration of a copier (image processing apparatus) used by an embodiment of the present invention;

FIGS. 2A to 2C are block diagrams showing an example of data arrangement in a data distribution processing system according to the first embodiment of the present invention;

FIGS. 4A to 4C are diagrams showing an example of a screen brought up after successful authentication according to the first embodiment of the present invention;

FIG. 5 is a flowchart illustrating an example of an input process in the data distribution processing system according to the first embodiment of the present invention;

FIG. 13 is a diagram showing an example of data (restoration information) recorded in a bar code or IC card in the first embodiment of the present invention;

FIG. 20 is a diagram showing an example of restoration information when data blocks are multiplexed in the data distribution processing system according to the second embodiment of the present invention;

DESCRIPTION OF THE EMBODIMENTS

Figure 2C:
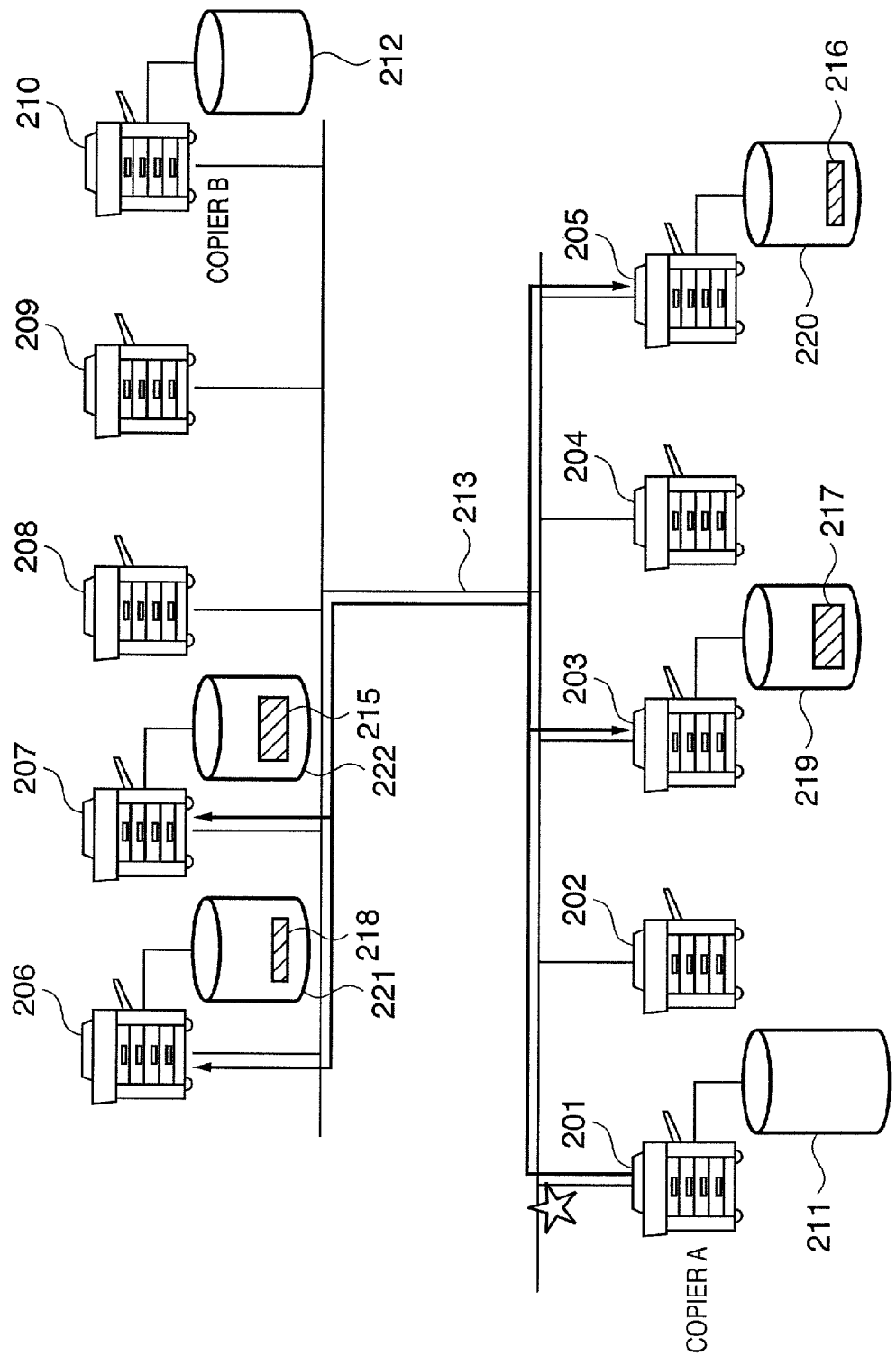

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A preferred embodiment of the present invention will now be described in detail with reference to the drawings.

FIG. 1 is a block diagram showing an example of a detailed configuration of a copier (image processing apparatus) used by an embodiment of the present invention described below. As shown in FIG. 1, the copier (image processing apparatus) has the following devices connected via a bus 101.

A CPU 102 performs various types of control and computation on its own functions including a print processing during printing and image processing during scanning. A RAM 103, which is a volatile memory, stores computational results produced by the CPU 102 as well as image data, font data, and the like for printing and scanning. A ROM 104, which is a nonvolatile memory, stores programs for operation of the CPU 102 as well as font data and the like. The ROM 104 may be rewritable. Also, the programs for operation of the CPU 102 may be loaded on the RAM 103.

The CPU 102 gives instructions and the like to an input unit 105, output unit 106, network interface 107, disk interface 108, and unit controller 110. The CPU 102 stores information needed temporarily such as processing results and input results in the RAM 103.

The input unit 105 receives a scan command and the like from a user. It processes inputs from a touch screen and the like although not shown in FIG. 1. The output unit 106 displays status and functions of the copier and other information needed to receive commands from the user. The information is displayed on the touch screen although not shown in FIG. 1. The network interface 107 is used for connection with an external network such as a LAN. That is, the copier (image processing apparatus) exchanges data such as images with other copiers, devices, and computers via the network interface 107.

The disk interface 108 is connected to a hard disk 109. The hard disk 109 stores image data, programs, and other data to be retained. The data stored in the hard disk 109 is used by being loaded on the RAM 103, as required, on instructions from the CPU 102. There may be more than one hard disk 109.

Devices which undertake print, scan, FAX, and other functions of the copier are connected to a unit controller 110. A separate unit controller 110 may be provided for each function.

The copier (image processing apparatus) is equipped with an input interface, display unit, and the like (not shown). The present invention is applicable not only to the copier of the configuration shown in FIG. 1, but also to any copier capable of exchange with other copiers via a network.

Next, reading of image data will be described with reference to FIG. 1. When the user gives a scan command via the input unit 105, a program running on the CPU 102 receives the command. Image data is read via a scanner unit (not shown) connected to the unit controller 110. The scanner unit may be equipped with an ADF (Auto Document Feeder) so as to be able to capture multiple pages in a batch. The image data is stored in the hard disk 109 via the disk interface 108.

First Embodiment

Now, distributed storage and reconstruction of data in a data distribution processing system according to the first embodiment of the present invention will be described in detail below. FIGS. 2A to 2C are block diagrams showing an example of the data distribution processing system according to the first embodiment of the present invention.

In the system shown in FIG. 2A, ten copiers 201 to 210 are connected to the network 213. Although only the copiers 201 and 210 are shown as being connected with the respective storage devices 211 and 212, it is assumed that the other copiers are similarly connected with storage devices such as hard disks.

Description will be given of a case in which a document scanned by copier A (201) is outputted by copier B (210). The document scanned by copier A (201) is stored temporarily as image data 214 in the storage device 211 connected to copier A (201). It is assumed that when copier A (201) is instructed to scan the document, a target device (copier B 210) and valid hours for output are specified.

Copier A (201) splits the scanned image data into multiple blocks of random sizes. Alternatively, the image data may be split into equal blocks of the same size. FIG. 2B shows an example of how the data after the split (data blocks 215 to 218) are stored in the storage device 211. In the following drawings, corresponding components are denoted by the same reference numerals, and description thereof will be omitted.

Copier A (201) selects four copiers—equal in number to the data blocks—from among the copiers (202 to 209) excluding itself and the output destination copier B (210). Although the copier itself and the output destination are not included according to this embodiment, naturally they may be included. It is assumed in this example that four copiers 203, 205, 206, and 207 are selected, for example. In FIG. 2C, the data blocks 215 to 218 in the storage device of copier A (201) are assigned randomly. Specifically, in FIG. 2C, they are assigned to the copiers 203, 205, 206, and 207 indicated by heavy lines.

As shown in FIG. 2C, the data block 217 is placed in the storage device 219 of the copier 203 and the data block 216 is placed in the storage device 220 of the copier 205. Also, the data block 218 is placed in the storage device 221 of the copier 206 and the data block 215 is placed in the storage device 222 of the copier 207. As the data is assigned to the copiers 203, 205, 206, and 207 on the network 213, the data 214 in the storage device 211 is deleted. When the data blocks are assigned to the copiers 203, 205, 206, and 207, information about valid output periods are recorded on the copiers 203, 205, 206, and 207 at the same time. Consequently, the data blocks whose valid output periods have expired are deleted spontaneously and automatically by the respective copiers, thereby cutting waste in the storage devices. Besides, there is no specific need for management of the data blocks. The data is deleted here by complete deletion which involves overwriting the data itself with null or random data instead of simply deleting a file management table.

Copier A (201) converts delivery destination information, output destination information, and valid output period information about data blocks into two-dimensional bar code format and prints them on paper. Available methods for conversion into two-dimensional bar code format use, for example:

QR Code™ (Denso Wave Inc.),
Data Matrix (International Data Matrix, Inc.),
VeriCode (Veritec Inc.),
MaxiCode (UPS Inc.),
CP CODE (Japan ID Tech Inc.),
PDF417 (Symbol Technologies Inc.) and
CODE 49 (Intermec Corp.).

Since all that need to be conveyed is delivery destination information, output destination information, and valid output period information about data blocks, any other encoding system may be used other than two-dimensional bar codes. Furthermore, as long as data can be presented, the data may be not only outputted on paper, but also recorded, for example, in an information recording device such as a memory card. Also, the data may be recorded after encryption by means of an encryption scheme such as AES (Advanced Encryption Standard).

Figure 11B:
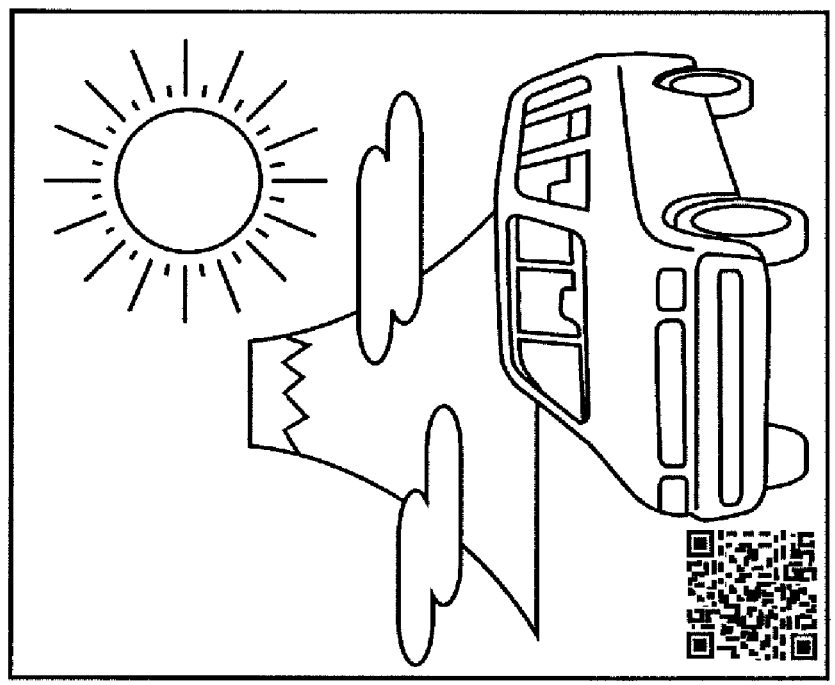
FIGS. 11A and 11B are diagrams showing an exemplary output of bar-coded information according to the first embodiment of the present invention.
Figure 11A:
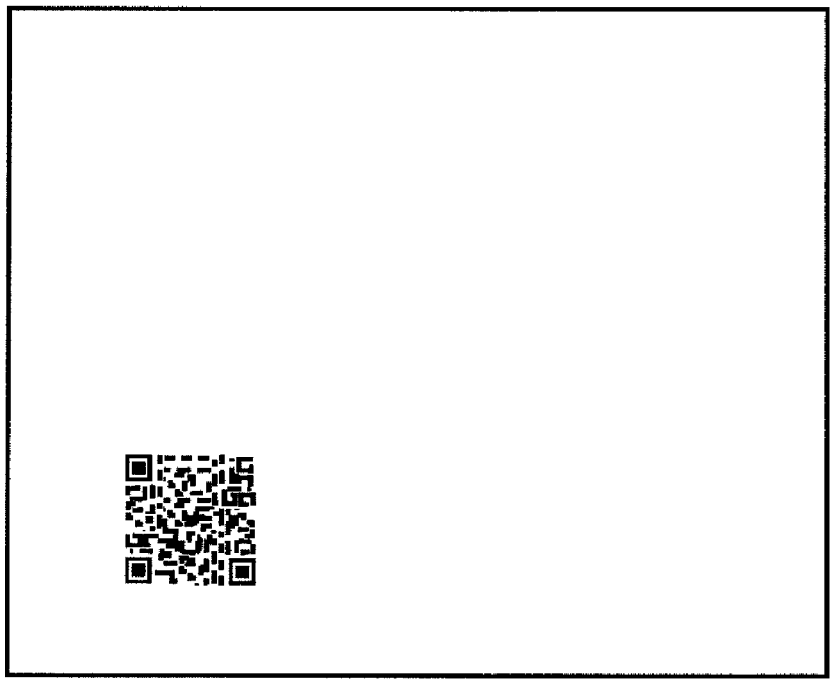

FIGS. 11A and 11B are diagrams showing an exemplary output of bar-coded information according to the first embodiment of the present invention. FIG. 11A shows delivery destination information, output destination information, and valid output period information about data blocks converted into two-dimensional bar code format (QR Code™) and outputted on paper by copier A (201). Although a single bar code is shown in FIG. 11A, more than one bar code may be outputted if data to be recorded grows too much to be included in a single bar code, for example, due to increases in the number of recipients of data blocks. In that case, a number is assigned to each bar code, indicating in what order it should be processed. Furthermore, if bar codes do not fit in one page, they may be outputted on more than one page. In FIG. 11A, only a bar code is printed on white paper. However, this will make it known that something important is carried in the paper. Thus, the two-dimensional bar code may be embedded as part of other images as shown in FIG. 11B. This will obscure the presence of the two-dimensional bar code. Alternatively, the information represented by the bar code above may be provided by being superimposed on images so that it will be imperceptible to the human eye.

FIG. 13 is a diagram showing an example of data (restoration information) recorded in a bar code or IC card in the first embodiment of the present invention. In FIG. 13, a section 1301 contains information which identifies a target device. According to this embodiment, this information is provided as an IP address. A section 1302 contains the total number of data blocks, which is 4 in this embodiment. A section 1303 contains information about an order of recombination of the data blocks as well as about destinations of the data blocks including IP addresses of devices, directory names, and file names. For example, the first data block to be combined is contained in a document named "xxxyy" in a directory named "¥userX¥184251" in a copier (device) whose IP address is 192.168.2.3.

Also, in FIG. 13, sections 1304 and 1305 contain a valid output period, where 1304 contains a start date/time while 1305 contains an end date/time. This means that the data is available for output from exactly 9 o'clock to exactly 17 o'clock on Jun. 1, 2005 in FIG. 13. If restoration information does not fit in a single bar code or the like, the total number of pieces of restoration information is indicated in section 1307 and the order of the given bar code in all the pieces of restoration information. For example, FIG. 13 indicates that this is the second piece (e.g., bar code) to be processed among five pieces of restoration information.

As described above, the end date/time of the valid output period is transmitted together with data blocks. The data blocks are deleted automatically when the end date/time expires on the respective copiers (devices). Each copier (device) may be allowed to set the time individually, but this will also allow a malicious party to falsify the time. For example, it is conceivable to synchronize all the copiers with a time server (NTP server) used to coordinate time on devices over a network, and thereby make them comply with a reference time. This will make malicious use through falsification of time difficult.

FIG. 13 shows only an example, and a device name, an ID unique to the device, or the like may be used instead of the IP address as long as it can uniquely identify the device. Also, a date/time format different from the one shown in the figure may be used. As described with reference to FIG. 11, if two or more bar codes are needed because of a large volume of information, serial numbers may be attached to identify the order of the bar codes. Furthermore, although not shown in the figure, output methods may be limited. Such is the case, for example, when data is only allowed to be printed, but prohibited from being acquired as electronic data.

Figure 12A:
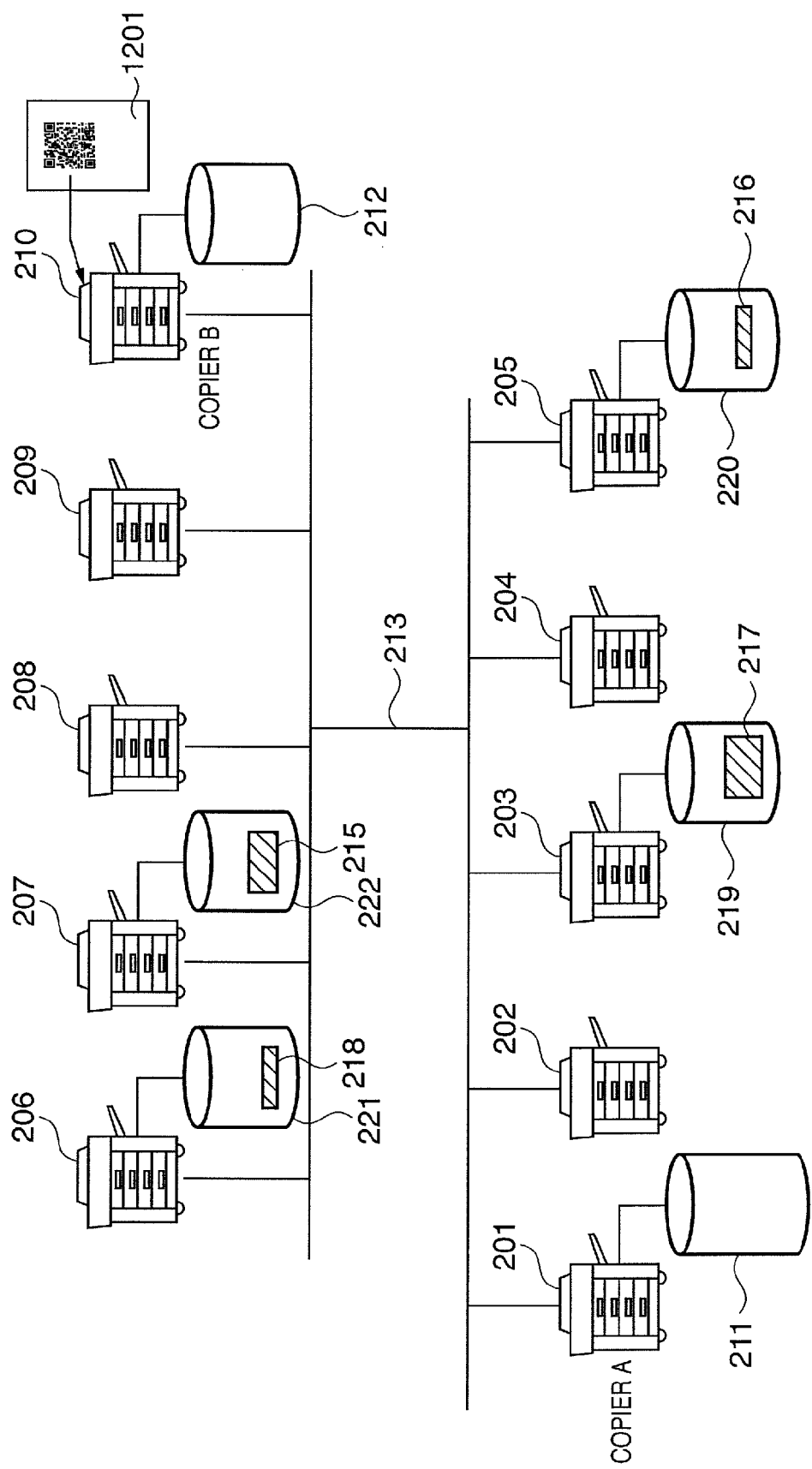
FIGS. 12A and 12B are diagrams illustrating an example of how split data is restored in the data distribution processing system according to the first embodiment of the present invention.
Figure 12B:
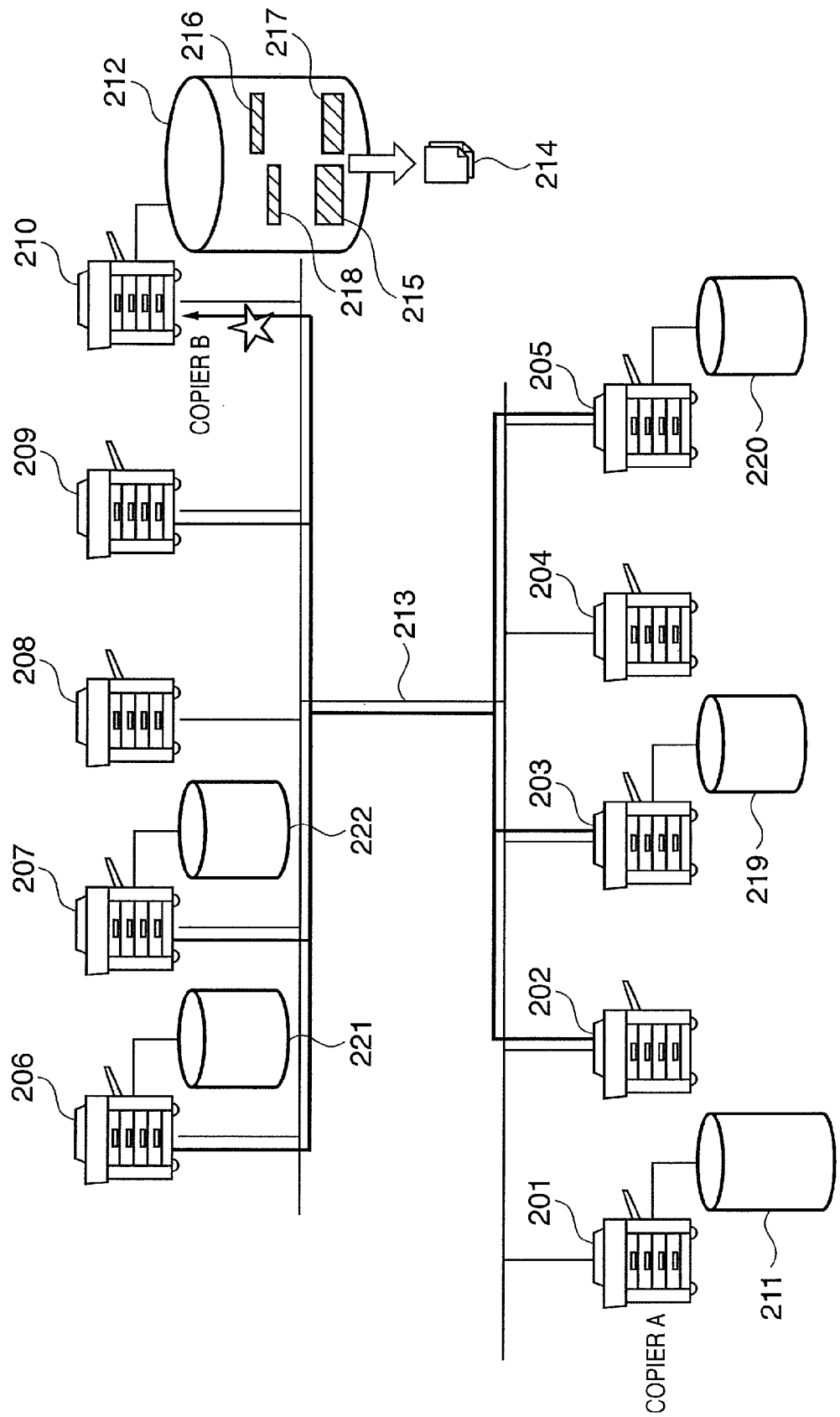

Next, description will be given of how split data is restored. FIGS. 12A and 12B are diagrams illustrating an example of how split data is restored in the data distribution processing system according to the first embodiment of the present invention.

As shown in FIG. 12A, bar code is read from paper 1201. Before reading the bar code, the user sets a mode for restoration of split data. The paper 1201 is scanned, the bar code is analyzed, and data is retrieved from the bar code. Regarding the analysis of the bar code, the QR Code™ mentioned above, for example, is open to the public as a JIS standard and ISO standard, and thus it can be analyzed by a known method. If another two-dimensional bar code is used, it is analyzed similarly by a known method. If the bar code is encrypted as described above, it is decrypted. If two or more bar codes are printed on a single sheet or multiple sheets of paper, their order is analyzed together with the bar codes themselves. According to this embodiment, bar coding and encryption are examples of means and are not an essential part of the present invention, and thus detailed description thereof will be omitted.

According to this example, the information shown in FIG. 13 is restored from the scanned bar code. The copier checks whether the copier itself is specified as an output device (1301 in FIG. 13) and whether the current time falls within the valid hours for output (1304 and 1305 in FIG. 13). This prevents data from being restored by an illegal copier (device) or outside the valid hours for output. For that, an error may be caused simply in order to make the data unrestorable or completely false data may be outputted in order to make it difficult for a malicious party to recognize that an error has occurred.

The copiers 203, 205, 206, and 207 are identified based on the analyzed data, and data is collected on copier B (210) based on the directory information and file name information (FIG. 12B). When the data is collected in FIG. 12B, the data blocks are deleted from the storage devices 219, 220, 221, and 222 connected to the copiers 203, 205, 206, and 207. Consequently, restoration of data is allowed only once, enhancing security. If it is desired to allow restoration a specified number of times, a field should be provided in the restoration information described in FIG. 13 to specify an allowable number of times of restoration. In that case, the number of times of restoration is recorded on each copier or output device each time the data is restored, and when the specified number is reached, the data blocks are deleted even within the valid output period. It is alternatively possible to allow the data blocks to be outputted any number of times within the valid output period without deleting them.

Since the order of reconstruction is known from the information analyzed from the bar code, the original data 214 can be outputted by being restored from the data 215, 216, 217, and 218 collected on copier B (210).

In the above description, the divided data is delivered alone to copiers on the network. If, for example, a malicious party is monitoring packets at a location indicated by a star in FIG. 2C, the malicious party can intercept the split data and may be able to restore the original data using the combination for reconstruction. The same thing can happen during restoration if the packet is monitored at a location indicated by a star in FIG. 12B. To prevent such a situation, the present invention provides dummy data, which is mixed in split data during delivery and acquisition.

Figure 14A:
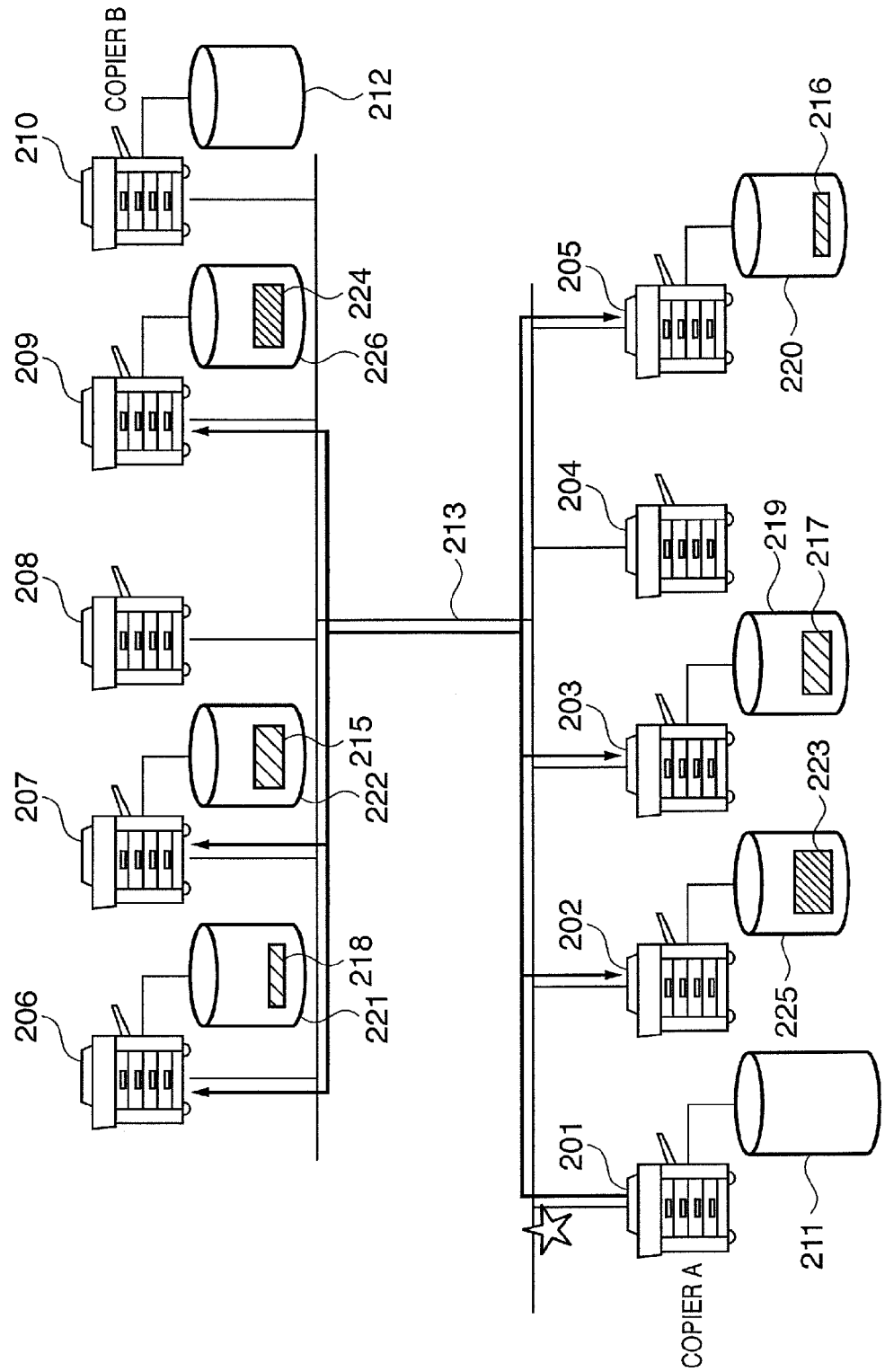
FIGS. 14A and 14B are diagrams illustrating an example of delivery and reception of data including dummy data in the data distribution processing system according to the first embodiment of the present invention.
Figure 14B:
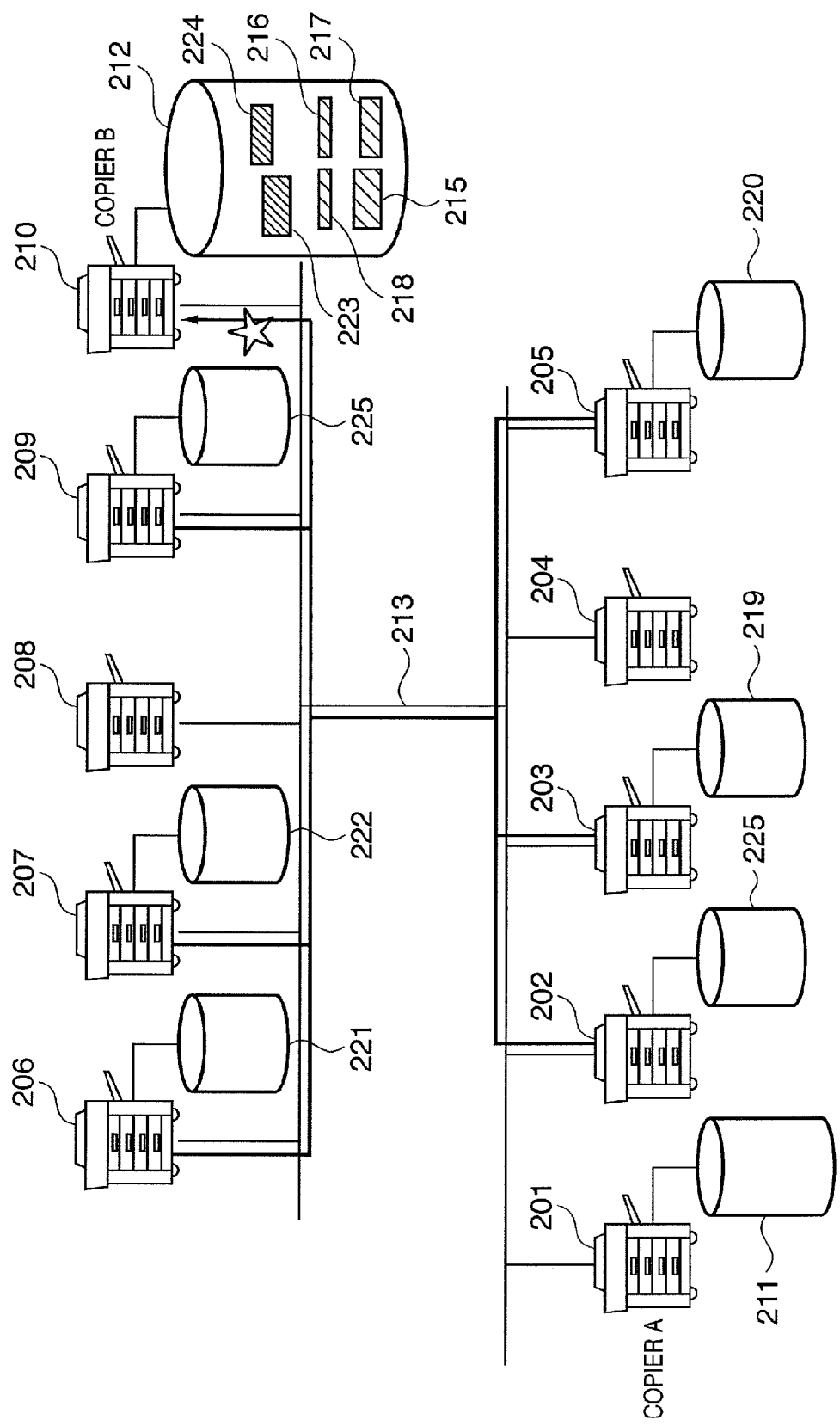

This will be described concretely with reference to FIGS. 14A and 14B. FIGS. 14A and 14B are diagrams illustrating an example of delivery and reception of data including dummy data in the data distribution processing system according to the first embodiment of the present invention. In this example, dummy data is delivered together with regular split data as shown in FIG. 14A.

In the example shown in FIG. 14A, dummy data 223 and 224 are delivered from copier A (201) to the storage device 225 connected to the copiers 202 and 209. Consequently, even if packets are monitored at the location indicated by a star, unnecessary data must be removed for restoration, making it more difficult to reconstruct the original data. That is, even if the packets are intercepted, the third party who intercepts the packets does not know whether unnecessary information (dummy data) is included. If included, the third party does not know how many packets are included. Furthermore, the third party does not know the order of data after the unnecessary data is removed, which makes it difficult to reconstruct the data.

Now, a case in which data is split into two parts will be described in detail. If the data is delivered without dummy data, the original data can be restored using permutations of two data items, i.e., two rearrangements of data. Now, suppose three data items are delivered including one type of dummy data. In that case, three patterns are conceivable: no dummy data (zero item), one item of dummy data, and two items of dummy data (a case in which all the data items are dummy is excluded). When no dummy data is included, a combination of three data blocks is available, which provides six possible permutations. When one item of dummy data is included, there are also six possible combinations. When two items of dummy data are included, there are three possible combinations. Thus, with the addition of one type of dummy data, the number of possible combinations increases to 15, whereas without dummy data, only two combinations are considered in decryption. Actually, there are a larger number of data blocks and more than one type of dummy data. This increases the number of combinations, making reconstruction difficult.

Alternatively, only false data may be delivered to copiers with random timing. Specifically, only multiple items of dummy data may be delivered together with valid output period information to copiers selected randomly. This makes it difficult for malicious parties who monitor packets to distinguish between real data and dummy only data, thus making the act of stealing packets more difficult. The copiers to which the dummy data is delivered do not know that the received data blocks are dummy. The dummy data is deleted automatically upon expiration of the valid output period attached to the dummy data. This eliminates the possibility of retaining the useless dummy data for a long time.

Similarly, when restoring data, if dummy data 224 and 225 are acquired from the copiers 202 and 209 as shown in FIG. 14B, it becomes difficult to restore the original data even if packets are monitored at the location indicated by a star. Although in FIGS. 14A and 14B, delivery of dummy data and acquisition of dummy data involves the same devices, different devices may be used between delivery and acquisition of dummy data because contents of the dummy data are irrelevant. Also, dummy data is generated in an appropriate manner so that different items of data will be delivered to different copiers.

Figure 3:
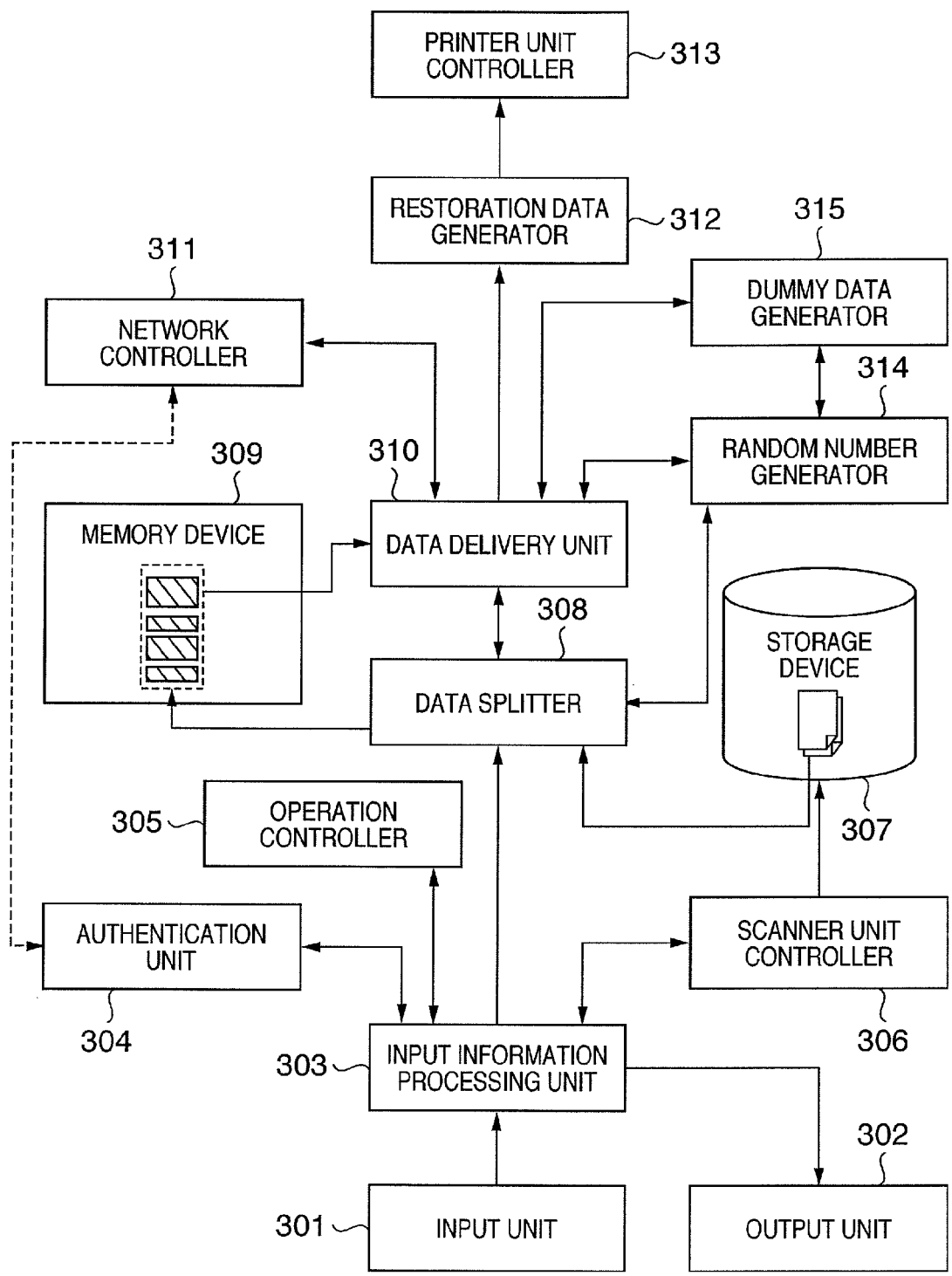
FIG. 3 is a diagram showing an example of functional module configuration of the data distribution processing system according to the first embodiment of the present invention.

FIG. 3 is a diagram showing an example of functional module configuration of the data distribution processing system according to the first embodiment of the present invention. To begin with, the user enters authentication information (e.g., a user ID, password, etc. which identify the user) needed to use the copier via an input unit 301. An input information processing unit 303 receives the information for authentication. Needless to say, the authentication information may be presented not only in the form of a user ID and password entered via a keyboard or the like, but also in the form of a device such as a magnetic card or IC card. The input information processing unit 303 passes the information for authentication to an authentication unit 304 and checks usage information. The authentication unit 304 may make an inquiry to an external authentication server or other copier or device which manages authentication information. Alternatively, the copier itself may have an authentication function or the authentication unit 304 itself may check the authentication information.

The authentication unit 304 returns authentication results to the input information processing unit 303. If the authentication fails, information to that effect is displayed on an output unit 302. If the authentication is successful, available operations are displayed on the output unit 302. Alternatively, all available operations may be displayed or limited operations may be displayed according to the level of authentication. An example of display on an operation panel of the copier will be described with reference to FIG. 4. FIGS. 4A to 4C are diagrams showing an example of a screen brought up after successful authentication according to the first embodiment of the present invention. Displays in FIG. 4 are presented in a simplified form to illustrate this example. Also, more information may be displayed according to functions of the copier.

When authentication succeeds, the screen shown in FIG. 4A appears. The screen in FIG. 4A presents buttons used to run Copy, Scan, and FAX functions, respectively, as well as an Exit button to exit the screen. Pressing a Scan button 401 brings up the screen shown in FIG. 4B, which allows the user to select further operations needed for scanning. The screen provides Mail Transfer, Save Internally, and Output to External Device buttons, as well as a button for use to return to the previous screen. The Mail Transfer button transfers scanned data to a PC or the like by mail. The Save Internally button saves the data to a hard disk or other storage device of the scanning copier. The Output to External Device button is used to output the data from another copier or device on the network.

Selecting the Output to External Device button 402 brings up the screen shown in FIG. 4C, which allows the user to specify an output destination copier (403) as well as a valid output period including an output permission start time (404) and output permission end time (405). Although an IP address is used in FIG. 4C to specify an output destination copier, a unique name or ID of the copier may be used alternatively. Also, although not shown in the figure, the user may be allowed to select a copier from a list of copiers available for output. Besides the output destination copier, the user enters the valid output period start time and valid output period end time. However, if the valid output period start time is not specified, the data becomes available for output right after scanning. The user may be required to specify the valid output period end time. Alternatively, a certain period (e.g., one day) may be set automatically if the user omits specifying the valid output period end time.

Inputs and outputs in FIGS. 4A to 4C are displayed in the output unit 302, and inputs entered via the input unit 301 are received by the input information processing unit 303. Besides, an operation controller 305 analyzes inputs, processes errors, changes process states, controls screens, and consequently updates the screen in the output unit 302. This is not an essential part of the present invention, and thus detailed description thereof will be omitted.

When the user specifies an appropriate target device and valid output period and presses a Start button 406, a scanner unit controller 306 is instructed to scan the original. The scanner unit controller 306 reads the original placed on document glass of the ADF of the copier (not shown), converts the scan data into digital data, and stores image data in a storage device (normally, a hard disk) 307. In so doing, the image data is stored in an area inaccessible to external networks or unauthorized modules to prevent leakage of stored information.

A special area may be provided in the storage device, or a lock may be set to deny access so that modules other than specific modules cannot perform copy or other operations—it does not matter what methods are used. Once the image data is stored in the storage device 307, the input information processing unit 303 is notified to that effect. Also, the input information processing unit 303 is informed of the storage location in the storage device 307. If a lock or other access restrictions are set on the image data, the scanner unit controller 306 also passes information needed to lift the restrictions to the input information processing unit 303.

Upon receiving results from the scanner unit controller 306, the input information processing unit 303 passes "target device information", "valid output period", and "image data storage location in the storage device 307" to a data splitter 308. It also, passes "image data unlock information" if necessary. The data splitter 308 acquires image data from the storage device 307, splits the image data in a splitting process, and stores the resulting data in a memory device 309.

To determine the number of data blocks and data size of data blocks, possible methods involve preparing a fixed table which defines correspondence between the number of partitions and size of original image data or using a random number of partitions or random size. For example, a fixed table which defines correspondence between the number of partitions and size of original image data is provided in the data splitter 308, and an appropriate value is determined for image data acquired from the storage device 307, using the table. The latter method uses random numbers in an appropriate range generated by a random number generator 314. Alternatively, a combination of the two methods may be used. Specifically, this involves finding a default number of partitions and default data size of data blocks for a certain image data size, generating random numbers, and changing the default values using the random numbers. The same data size may be used for all data blocks or different sizes may be used for different data blocks as required using random numbers generated by the random number generator 314.

When the splitting process is completed, the data splitter 308 passes "target device information", "valid output period", "image data storage location in the storage device 307", and "split data information" to a data delivery unit 310 and transfers control to the data delivery unit 310.

The data delivery unit 310 makes an enquiry to a network controller 311 and acquires a list of accessible copiers on the network. Next, the data delivery unit 310 selects one copier randomly from the list of accessible copiers on the network. It delivers the split data acquired from the memory device 309 to the selected copier via the network controller 311. In so doing, the data delivery unit 310 stores information as to "in what order a given data block should be combined" and "to what location (directory) of what device the data block was delivered and under what name" in a distribution list. This list corresponds to section 1303 in FIG. 13. By repeating this process, the data delivery unit 310 delivers all the data blocks. By checking the distribution list, measures may be taken to either allow or disallow the same copier to be selected as a recipient more than once.

When delivering dummy data, as many items of dummy data as determined based on fixed values, values acquired from the random number generator 314, or a combination thereof are generated. The dummy data is generated by a dummy data generator 315 using appropriate values generated by the random number generator 314. Once the dummy data is generated, it is transmitted to appropriately selected devices in the same manner as regular data blocks. There is no need to record the deliveries of dummy data in the distribution list, but they may be recorded for use in reconstruction.

Generally, image data has a very large size, and thus it is often impossible to store entire data in a memory device. To deal with this situation, after a process by the data splitter, some data is processed alternately by the data delivery unit 310 and data splitter 308. Alternatively, although not shown in the figure, split data may be stored in the storage device 307 and processed in batches by the data delivery unit 310. Naturally, if entire data can be stored in the memory device 309, the entire data stored in the memory device may be processed in batches by the data delivery unit 310.

Once all the data blocks are delivered, the data delivery unit 310 passes "target device information", "valid output period", "distribution list", and "user information" to a restoration data generator 312. Based on this information, the restoration data generator 312 generates information needed for restoration such as shown in FIG. 13. For example, the generated information is outputted by being embedded in a two-dimensional bar code. Output data containing the generated two-dimensional bar code is passed to a printer unit controller 313 and printed on a printer.

The generated restoration information may be not only printed as a two-dimensional bar code, but also printed as a one-dimensional bar code or stored on an IC card using a data recorder. For example, information to be recorded on an IC card may be generated by the restoration data generator 312, and the data may be written into the IC card using an IC card unit controller which corresponds to the printer unit controller 313. Also, by changing the restoration data generator 312 and the unit which corresponds to the printer unit controller 313, it is possible to store the restoration information not only in the bar code and IC card described in this example, but also on various media.

Now, description will be given using flowcharts. Processing on the input side can be represented by the flowchart shown in FIG. 5. FIG. 5 is a flowchart illustrating an example of an input process in the data distribution processing system according to the first embodiment of the present invention.

First, image data is acquired by a method such as described above (Step S501). Next, the image data acquired in Step S501 is split and delivered (Step S502). After that, an output process is performed to record decryption information for the information delivered in Step S502, in a bar code, IC card, or the like (Step S503).

Figure 6:
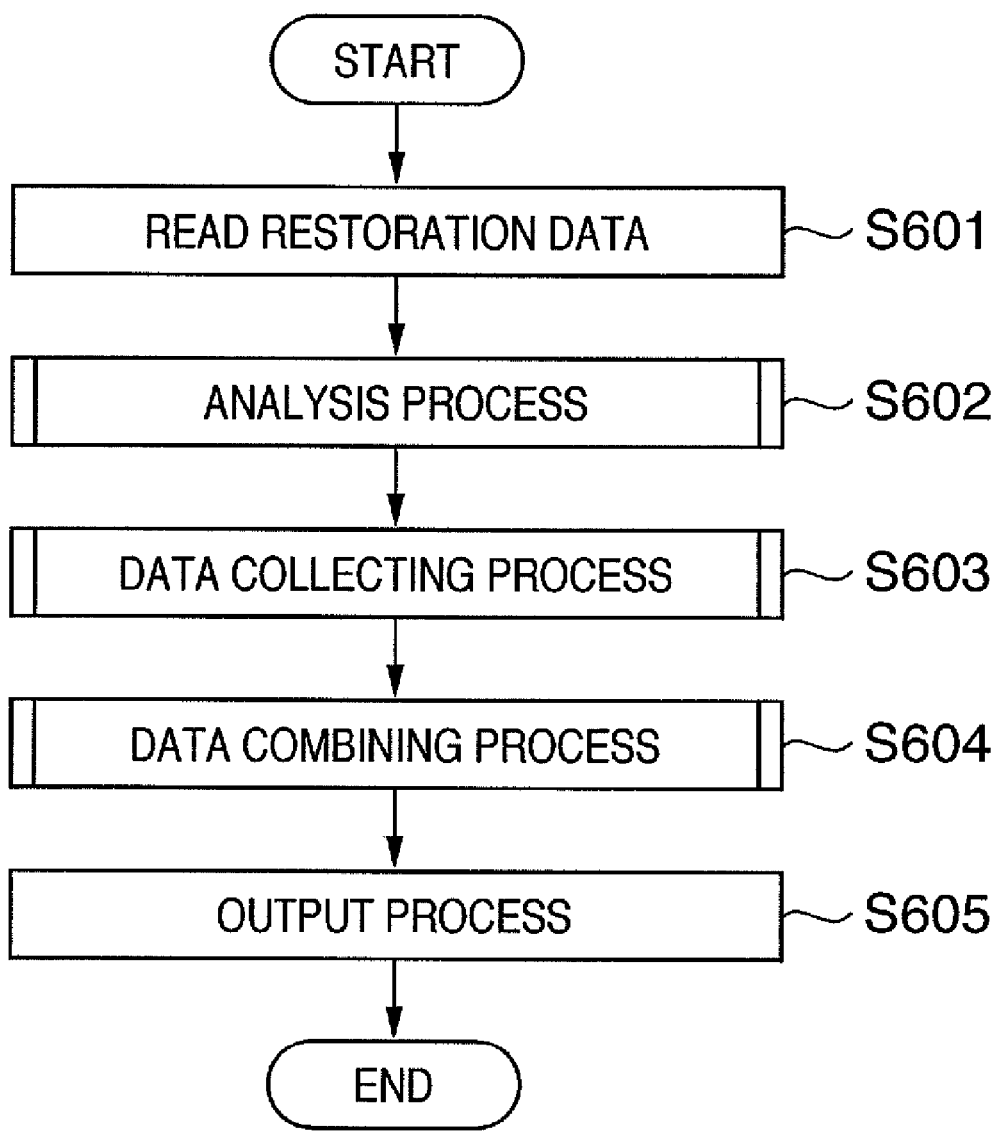
FIG. 6 is a flowchart illustrating an example of an output process in the data distribution processing system according to the first embodiment of the present invention.

On the other hand, processing on the input side can be represented by the flowchart shown in FIG. 6. FIG. 6 is a flowchart illustrating an example of an output process in the data distribution processing system according to the first embodiment of the present invention.

First, the decryption data outputted in Step S503 is read out of the readable recording medium (Step S601). Next, the bar code or the like of the decryption data is analyzed, or multiple items of decryption data are processed as appropriate (Step S602). Furthermore, based on analysis results produced in Step S602, data is collected from copiers (Step S603). Next, the data acquired in Step S603 is combined based on the analysis results of the decryption data produced in Step S602 (Step S604). Subsequently, the data is outputted to a printer unit or the like (Step S605).

Figure 7:
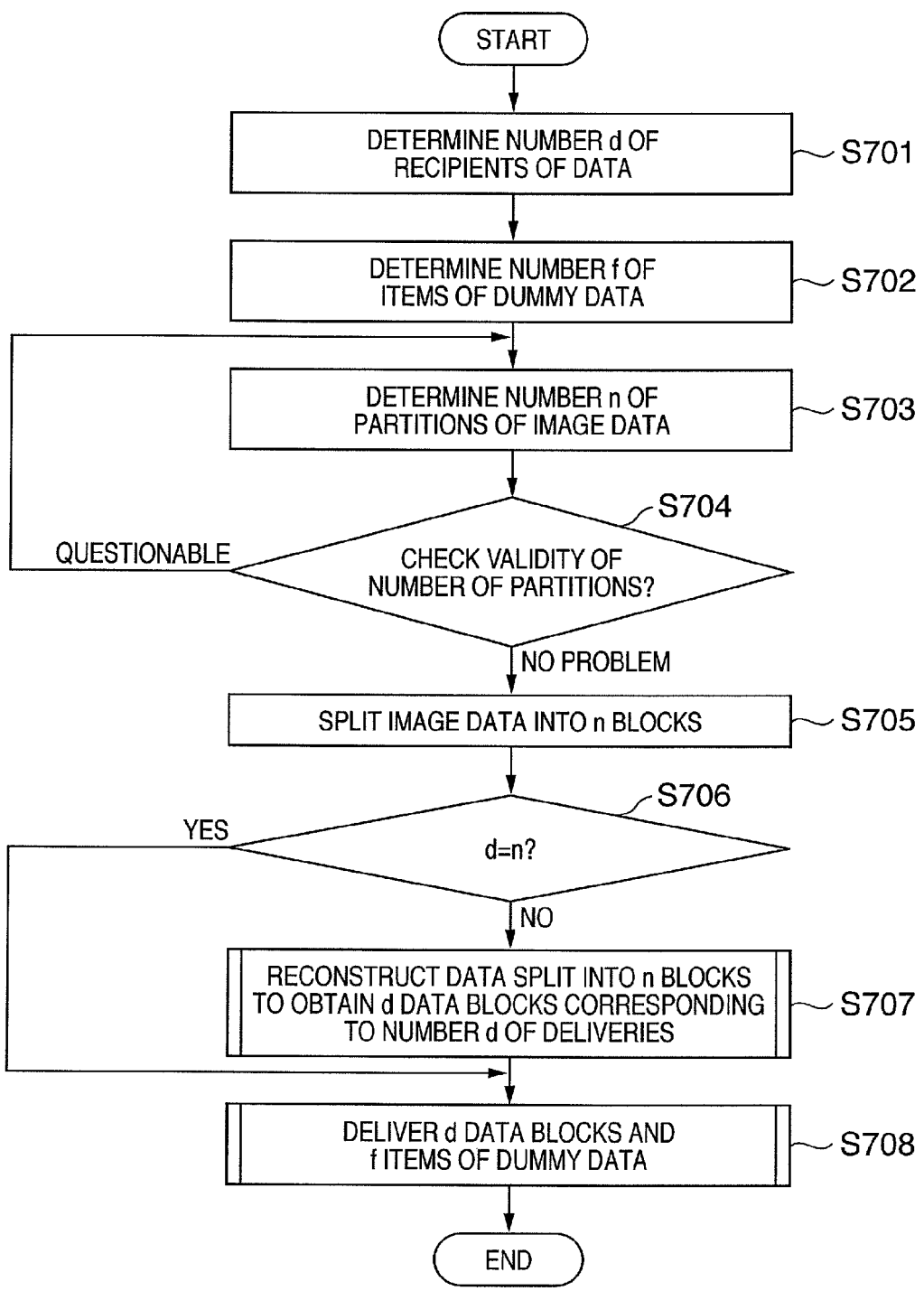
FIG. 7 is a flowchart illustrating details of a division/delivery process (Step S502) in the flowchart in FIG. 5.

Next, the division/delivery process Step S502 will be described in more detail with reference to FIG. 7. FIG. 7 is a flowchart illustrating details of the division/delivery process (Step S502) in the flowchart in FIG. 5.

The first step (Step S701) is to set (determine) the number of copiers to which the split data will be delivered. Possible methods include one which acquires the number of accessible copiers via the network controller 311. Other possible methods involves determining a number larger than a certain number using a random number to ensure security or determining the number of deliveries using a table which, being prepared in advance, defines correspondence between the number of devices and the size of original image data. Alternatively, the number of deliveries may be determined by the user or administrator of copiers. Also, a combination of the above methods may be used. The number of deliveries thus determined is designated as d.

The next step (Step S702) is to determine the number f of items of dummy data. As described above, the dummy data is constituted of false data irrelevant to data reconstruction. The larger the number, the more difficult the reconstruction. The number may be determined by a method similar to Step S701 or according to a predetermined security level. If there is no need to transmit dummy data, the number can be set to f=0.

The next step (Step S703) is to determine the number n of partitions to decide how many parts to split the image data into. The number n of partitions may be determined by the user. Alternatively, it may be determined based on the size of image data, number of accessible copiers, processing speed of the CPU, or the like. Also, it may be determined using a random number. Furthermore, it may be determined by a combination of the above methods. However, this number must be an integer which satisfies a condition $n \geq d > 1$ in relation to the number d of deliveries determined in Step S701. This constraint is used to prohibit duplicate deliveries of data to the same copier (device). If duplicate deliveries are permitted, it goes without saying that this constraint may be removed.

Next, validity of the number n determined in Step S703 is checked (Step S704). For example, when an image is split in bytes, if n is larger than the image size, if n is too large requiring time for processing, or if the validity is otherwise questionable, a smaller number n of partitions is determined anew in Step S703. In so doing, reprocessing is performed in Step S703, considering the validity check failure in Step S704.

If there is no problem, the flow goes to Step S705. In Step S705, the image data is split into n blocks according to the number n determined in Step S703. The image data may be split into blocks of the same size. Alternatively, it may be split into n blocks of random sizes using random numbers. As an example of random sizes, if the size of the image data is s and the blocks are increased or decreased 10% over the blocks of the same size, random numbers in the range of $\pm[s/n] \times (10/100)$ (where [ ] is the Gauss' symbol) can be generated and applied to [s/n]. In this case, however, the number of partitions may not be n ultimately. Thus, if the number of partitions is smaller than n, other data can be split, or if the number of partitions exceeds n, some data blocks can be combined so that the number of partitions will be n.

Figure 8A:
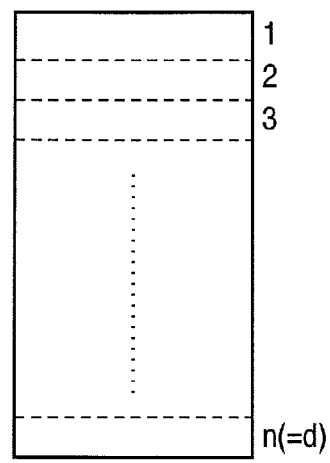
FIGS. 8A and 8B are diagrams showing an example of split data according to the first embodiment of the present invention.
Figure 8B:
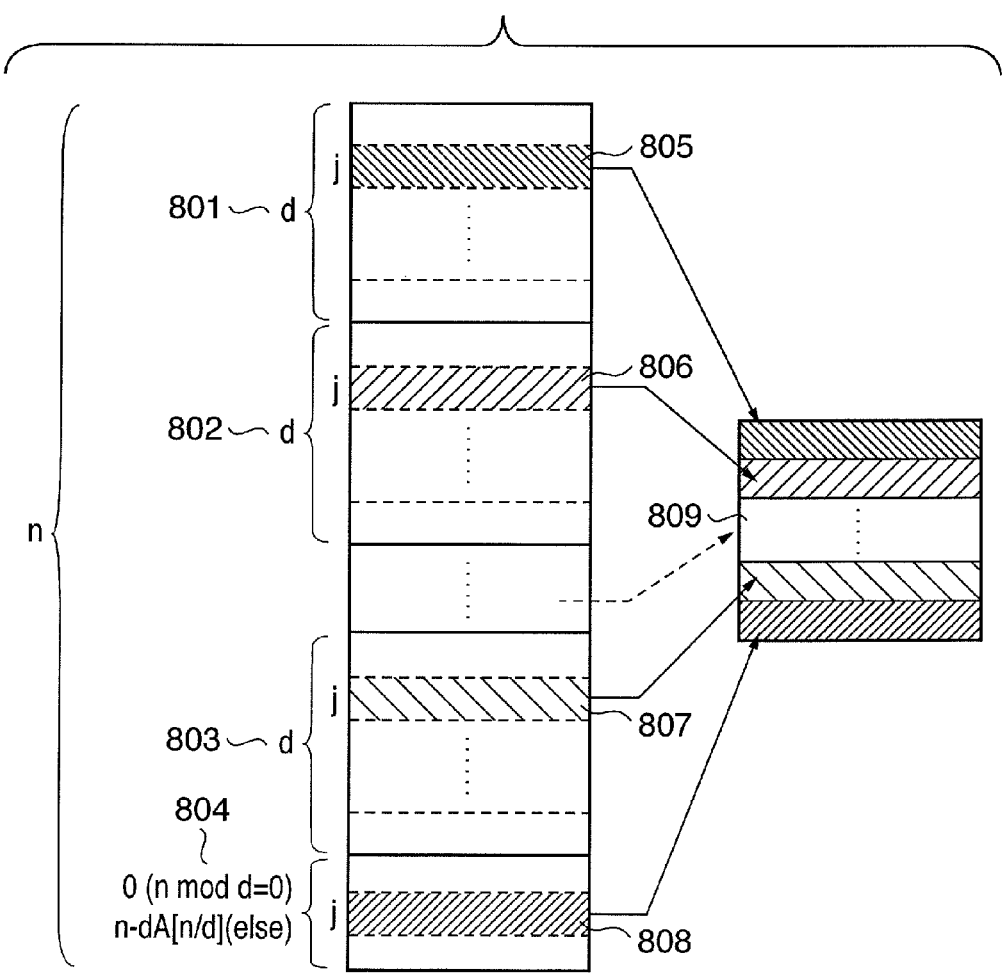

It is checked whether the number n of partitions matches the number of the devices (d locations) to which the data will be delivered (Step S706). If the numbers match (Yes), the flow goes to Step S708. On the other hand, if the numbers do not match (No), i.e., if the number n of partitions is larger than the number d of deliveries, which can happen because of the condition n≧d>1, the flow goes to Step S707. When the condition d=n is satisfied, it is determined that the split image data can be delivered as they are to the d copiers (devices) as shown in FIG. 8A. FIGS. 8A and 8B are diagrams showing an example of split data according to the first embodiment of the present invention.

In Step S707, the data split into n blocks is reconstructed to obtain d data blocks. Details of Step S707 will be described later. In Step S708, d data blocks and f items of dummy data are delivered to the copiers. Although in the flowchart, the number of dummy data is treated separately and is not included in the number d of deliveries, it may be included. In that case, it is necessary to make changes including changing the condition in Step S703 to n≧d+f>1 and changing the criterion in Step S706 to "whether the sum of the number n of partitions and the number f of items of dummy data matches the number of the devices (d locations) to which the data will be delivered". However, since there is no essential difference, this example does not include the dummy data in the number of the devices. An example of Step S708 will be described later with reference to the flowchart in FIG. 10.

If Step S706 produces a "false" (No) answer, the data split in Step S707 must be organized into d items. An exemplary method for this will be described with reference to FIG. 8B. The n data blocks are placed in areas (801, 802, and 803) each of which contains d items. Any remaining data (i.e., if n mod d≠0) is assigned to a new area (804), which should contain n−d×[n/d] data items. If it is desired to create a j-th data block (≦d), the j-th data item in each area is taken out and combined in sequence (805, 806, 807, and 808). If the number of data items in the area (804) which contains the remaining data is less than j, no data item is taken out of the area 804. In this way, the data 809 to be delivered to the j-th copier (device) is generated.

When using data blocks of the same size, the data size of data 809 delivered to copiers (devices) may not match among the copiers (devices) if the number of the copiers (devices) cannot be divided by n. Even in that case, if the size of each data block or a combination of the size of the original data and the number of partitions is known, it is possible to reproduce the individual data blocks and thereby reproduce the original image data. However, when the sizes of individual data blocks are determined randomly without regularity, the original image data cannot be reproduced unless the sizes of individual data blocks are known.

Figure 15:
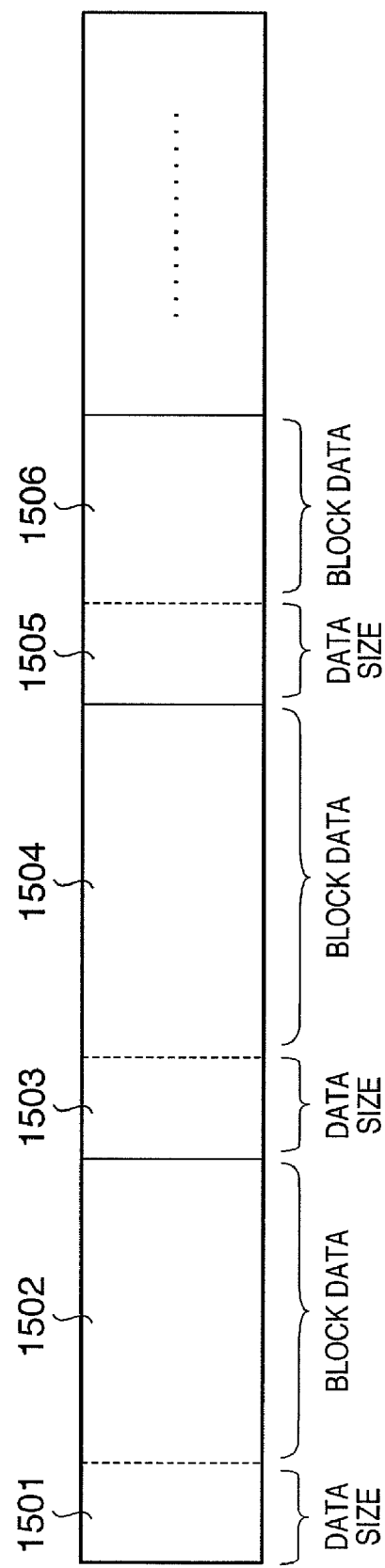
FIG. 15 is a diagram illustrating an example of how data blocks are held in the data distribution processing system according to the first embodiment of the present invention.

FIG. 15 shows an example of data 809 whose data size can be seen. FIG. 15 is a diagram illustrating an example of how data blocks are held in the data distribution processing system according to the first embodiment of the present invention. A fixed-length field is provided in front of each data block to enter the data size of the data block. In FIG. 15, the sizes of data blocks 1502, 1504, and 1506 are entered in fields 1501, 1503, and 1505. For example, the size of the field in which the data size of each data block is entered is fixed to 4 bytes. Consequently, the first data block begins at the 5th bytes and ends at the x-th bytes (where x is 4+the data size of the first data block). The second data block begins at the (x+5)-th bytes and ends at the y-th bytes (where y is 4+the data size of the first data block+4+the data size of the second data block). The sizes of the subsequent data blocks can be calculated similarly.

The method described above is only an example of methods for acquiring sizes and is not meant to be limiting. For example, sizes may be handled by separate management data, which may be delivered to another copier (device) in a manner similar to data blocks. In that case, the data is delivered to d+1 copiers (devices). Alternatively, individual data sizes may be written in a bar code, IC card, or the like.

If the number n of partitions is larger than the number d of deliveries, the data delivered to copiers (devices) becomes more complicated, making it more difficult for malicious parties to restore the original data.

Figure 10:
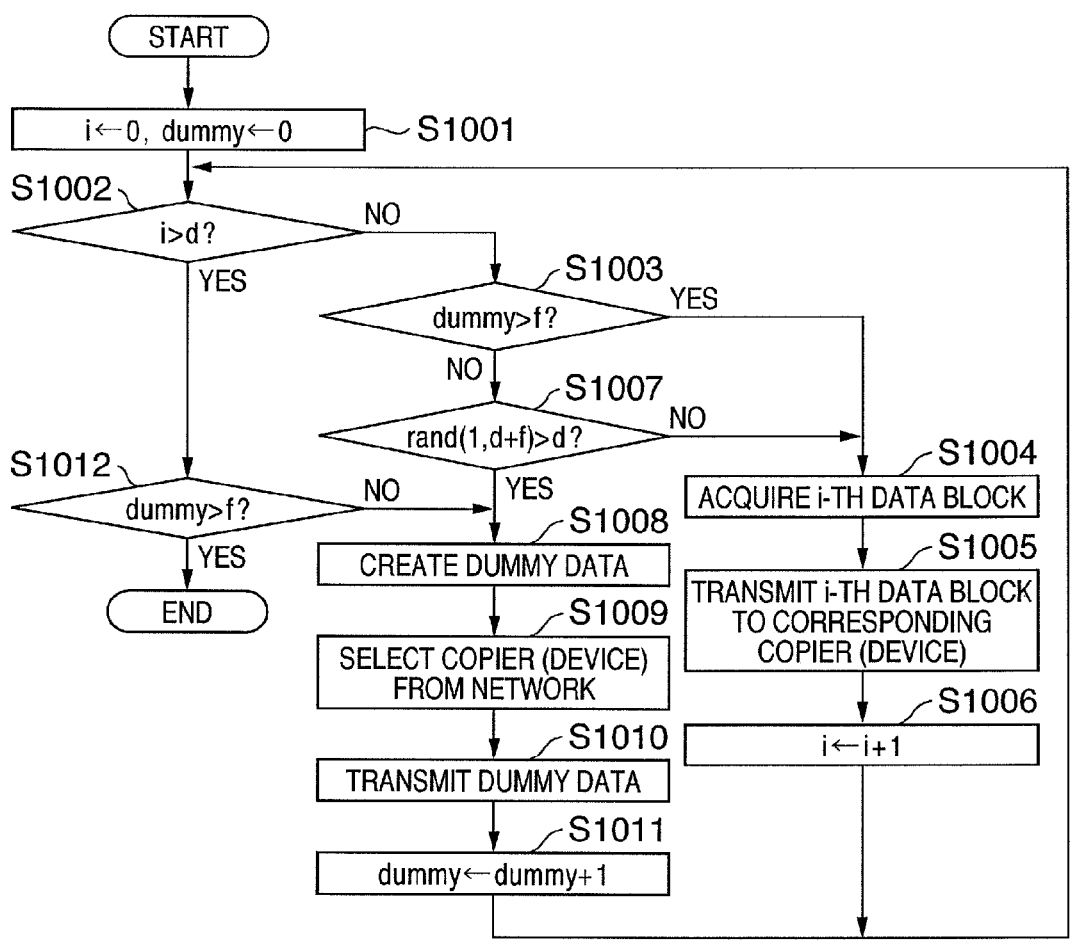
FIG. 10 is a flowchart illustrating details of delivery of the split data and dummy data (Step S708) in the flowchart in FIG. 7.

An example of delivery of split data (Step S708) will be described with reference to a flowchart (FIG. 10). FIG. 10 is a flowchart illustrating details of delivery of the split data and dummy data (Step S708) in the flowchart in FIG. 7. It is assumed that there are d recipient copiers (devices) and f items of dummy data. Also, rand (m, n) is a function used to generate random integers in a range of [m, n] (n>m).

In Step S1001, zero is assigned to both "i" and "dummy". In Step S1002, it is determined whether i>d. Since "i" is a variable incremented each time a data block is delivered, this conditional expression has the same meaning as a determination as to whether all the data blocks have been delivered. If the conditional expression is true (Yes) (if all the data blocks have been delivered), the flow goes to Step S1002. If it is false (No) (if all the data blocks have not been delivered), the flow goes to Step S1003.

In Step S1003, it is further determined whether dummy>f. Since "dummy" is a variable incremented each time dummy data is delivered, this conditional expression has the same meaning as a determination as to whether all the items of dummy data have been delivered, as in the case of Step S1002. If the conditional expression is true (Yes) (if all items of dummy data have been delivered), the flow goes to Step S1004. If it is false (No) (if all items of dummy data have not been delivered), the flow goes to Step S1009.

Step S1004 to Step S1006 corresponds to the process of delivering a data block. In Step S1004, the i-th data block is acquired. In Step S1005, the data block acquired in Step S1004 is delivered to the copier (device) corresponding to the i-th data block. Although a method for selecting the corresponding copier (device) is not described here, any method may be used as long as it can select a copier (device) from accessible copiers (devices) on the network. In Step S1006, "i" is incremented by 1, and the flow returns to Step S1002.

In Step S1007, a random number in the range of 1 to d+f (rand (1, d+f)) is generated and it is determined whether the random number is really larger than d. The random number is used to adjust the timing to deliver dummy data. Since the number of deliveries is d+f, this discriminant is used to set the probability of delivery of dummy data to p. Alternatively, other conditions may be used such as simply generating values of 0 and 1 at random. However, this could cause dummy data to be transmitted only in the first half or otherwise unevenly. If Step S1007 produces a "true" (Yes) answer, the flow goes to Step S1008 to transmit the dummy data. If Step S1007 produces a "false" (No) answer, the flow goes to Step S1004 to transmit split data.

Step S1008 to Step S1011 corresponds to the transmission process of dummy data. In Step S1008, dummy data is created. Although not shown here, there is a method which generates dummy data using random numbers. Also available is a method which uses a combination of data prepared in advance or the like. In Step S1009, an accessible copier (device) is selected on the network. By excluding the recipients of the data blocks at this time, it is possible to deliver data without duplication. In Step S1010, the dummy data created in Step S1008 is transmitted to the copier (device) selected in Step S1009. In Step S1011, "dummy" is incremented by 1, and the flow returns to Step S1002.

In Step S1012, it is determined whether dummy>f, the same conditional expression as in Step S1003, is true. Since i>d is true (all the data blocks have been delivered) in Step S1002, there is no more data block to be delivered. Consequently, if the conditional expression is false (all items of dummy data have not been delivered), the remaining items of dummy data should be delivered, and thus the flow goes to Step S1008. On the other hand, if the conditional expression is true (all the items of dummy data have been delivered), all the data blocks as well as all the items of dummy data have been delivered, and thus the flow comes to an end.

Figure 16:
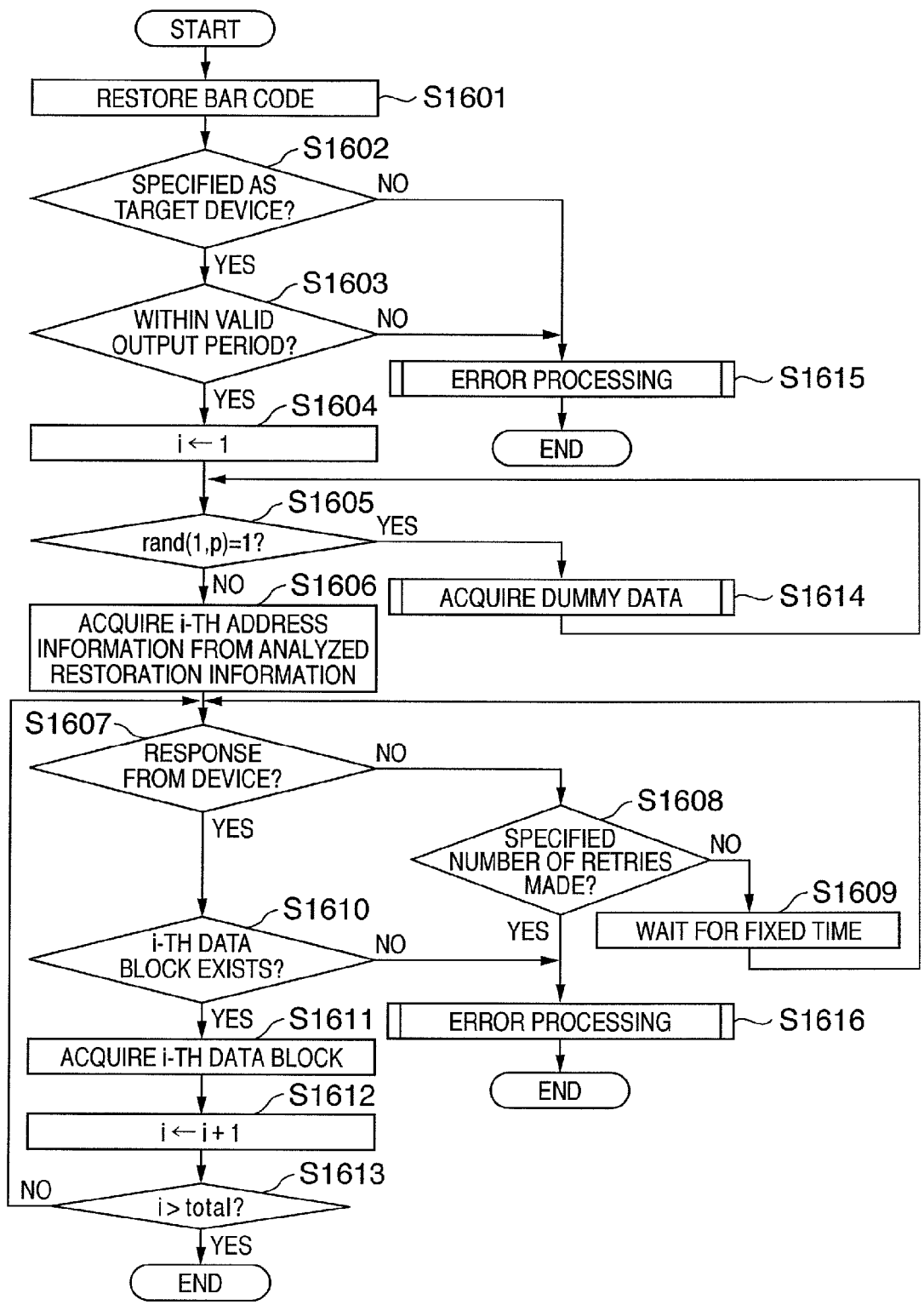
FIG. 16 is a flowchart illustrating procedures for data restoration and output in the data distribution processing system according to the first embodiment of the present invention.

Next restoration and output of data will be described with reference to a flowchart. FIG. 16 is a flowchart illustrating procedures for data restoration and output in the data distribution processing system according to the first embodiment of the present invention. The flowchart in FIG. 16 is an example which illustrates Steps S602 and S603 of the flowchart in FIG. 6 in more detail. It is assumed that data blocks are acquired from copiers (devices) in a total number of "total" and that dummy data is acquired with a probability of $\rho$. It is also assumed that $\rho$ has been preset by user input or copier (device) settings.

In Step S1601, the scanned bar code is interpreted. Specifically, the restoration information (e.g., FIG. 13) is recovered from the bar code. The restoration information is decrypted if it has been encrypted by means of a known encryption scheme such as AES to prevent the restoration information from being read from the barcode easily. If there are multiple pieces of restoration information, they are arranged in the order in which they will be processed as described with reference to FIG. 13.

In Step S1602, it is determined whether the device itself is specified as an output device in the restoration information. For the determination, the IP address may be used as described in FIG. 13. Alternatively, the determination may be made using a MAC address of a network card, a unique name or ID assigned to the device and contained in the restoration information, or the like. If the device itself is not a target device (No), the flow goes to Step S1615 to perform error processing and then comes to an end. On the other hand, if the device is a target device (Yes), the flow goes to Step S1603.

In Step S1603, it is determined whether the current time falls within the valid output period specified in the restoration information. The determination may be made based on internal time of the copier (device) or an inquiry made to another device which manages time. If the current time does not fall within the valid output period (No), the flow goes to Step S1615 to perform error processing and then comes to an end. On the other hand, if the current time falls within the valid output period (Yes), the flow goes to Step S1604.

In Step S1604, "1" is assigned to "i". In Step S1605, a random number in a range of [1, p] is generated and it is determined whether the generated random number is "1". If Step S1605 produces a "false" (No) answer, the flow goes to Step S1606. On the other hand, if Step S1605 produces a "true" (Yes) answer, the flow goes to Step S1614 to acquire dummy data. That is, dummy data is returned when an invalid data request is made to a copier (device) selected randomly. Specifically, a data request is made to a random device using a random folder name and random file name. If matching data exists, it is returned, but it is regarded as dummy data because it has no use for restoration. The dummy data is discarded after acquisition because it is not used, and the flow goes to Step S1605.

In Step S1606, the address information analyzed in Step S1601 is acquired to acquire the i-th data block. In Step S1607, it is checked whether the device responds. If there is no response (No), it is likely that the device is engaged in another process, is in sleep mode, is out of order, or the like. Consequently, the flow goes to Step S1608 to check whether a specified number of retries have been made. If the specified number of retries have not been made yet (No), the flow waits in Step S1609 for a fixed period of time and returns to Step S1607 to check again whether the device responds. If it is found in Step S1608 that the specified number of retries have been made (Yes), the flow goes to Step S1616 to perform error processing and then comes to an end. If there is a response from the device in Step S1607 (Yes), the flow goes to Step S1610 to check whether the i-th data block to be acquired exists.

If it is found in Step S1610 that there is no i-th data block (No), the flow goes to Step S1616 to perform error processing and then comes to an end. If it is found in Step S1610 that the i-th data block exists, the data block is acquired in Step S1611 and "i" is incremented by 1 in Step S1612. In Step S1613, it is checked whether "i" exceeds "total". If "total" it not exceeded (No) the flow returns to Step S1605 to acquire a next data block. If "total" is exceeded (Yes), meaning that all the data blocks have been acquired, the entire process is finished.

Next, the data combining process in Step S604 of the flowchart in FIG. 6 will be described with reference to a flowchart in FIG. 17 as well as FIGS. 18A and 18B. First, an example of a restoration process will be described with reference to FIGS. 18A and 18B. FIGS. 18A and 18B are diagrams illustrating an example of a restoration method for the data distribution processing system according to the first embodiment of the present invention. As described with reference to FIG. 5B and FIG. 15, a fixed-length field is provided in front of each data block to enter the data size of the data block.

It is assumed in the description of the flowchart that fixed-length field is 4 bytes, but it may have any other size which can be specified. Thus, each data block has size information as well as actual data, as shown in 1801, 1802, and 1803 in FIG. 18A. For example, the first data block (1801) contains, at the head, 4 bytes of size information (1805) about the first actual data item. This is followed by the first actual data item (1806), size information (1807) about the second actual data item, the second actual data item (1808), and so on. In FIGS. 18A and 18B, the j-th data item contained in the i-th data block is denoted by 1–j. It is assumed that there are d data blocks in total. Data restoration begins with taking out the actual data items from the head of the first to the d-th data blocks. The extracted actual data items are combined in order beginning with the first data block. This produces data such as 1804, which is intermediate data in the process of being restored.

Removing the actual data items and their size information from the head leaves the data blocks as shown in 1809, 1810, and 1811 in FIG. 18B. In the same manner as described above, the actual data items are taken out from the head of the first to the d-th data blocks. The extracted actual data items are combined in order beginning with the first data block. They are placed behind the first intermediate data in the process of being restored (1812). By repeating the process until no data remains in the data blocks, it is possible to restore the original data.

Figure 17:
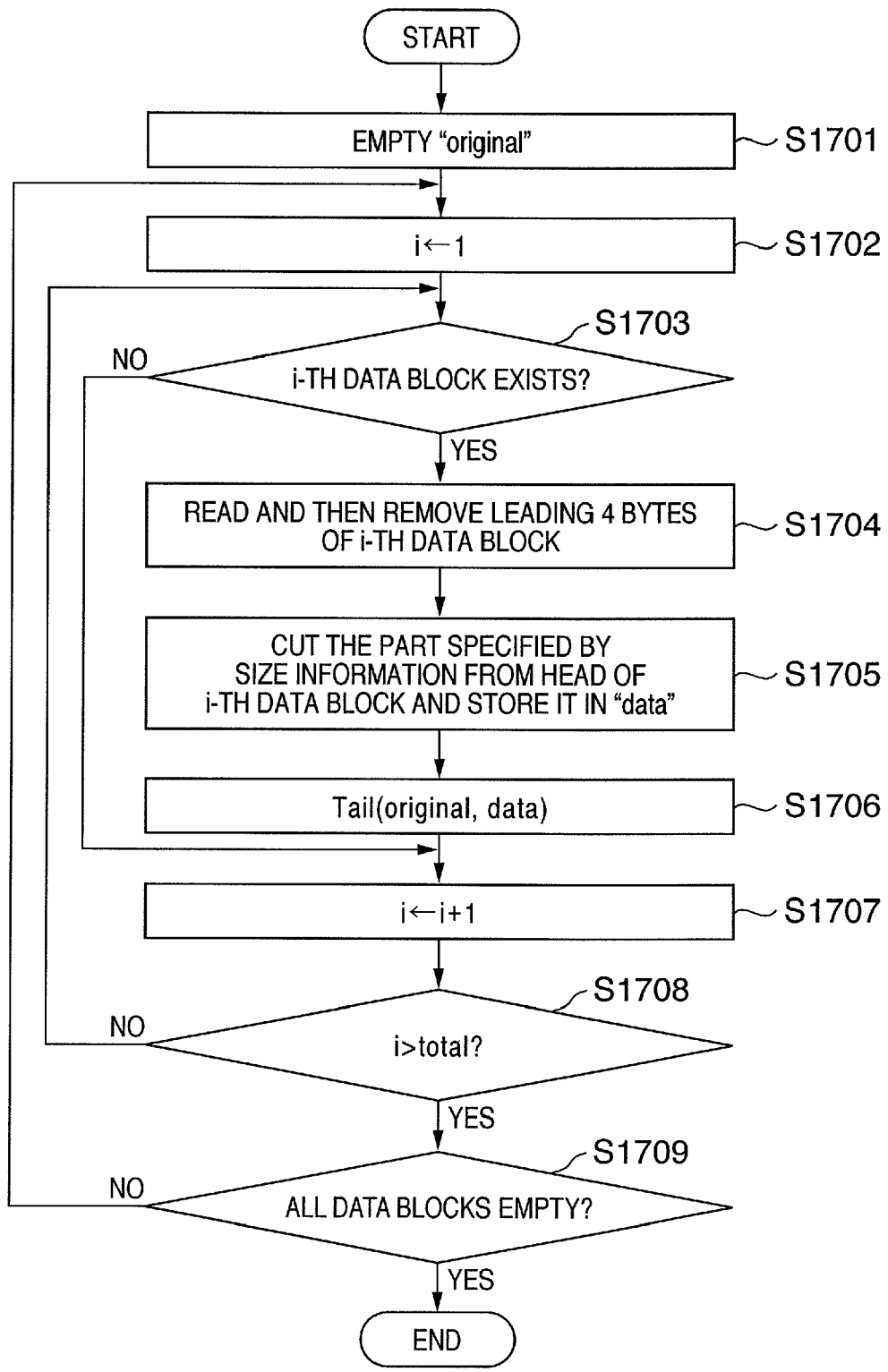
FIG. 17 is a flowchart illustrating how split data is restored in the data distribution processing system according to the first embodiment of the present invention.
Figure 18A:
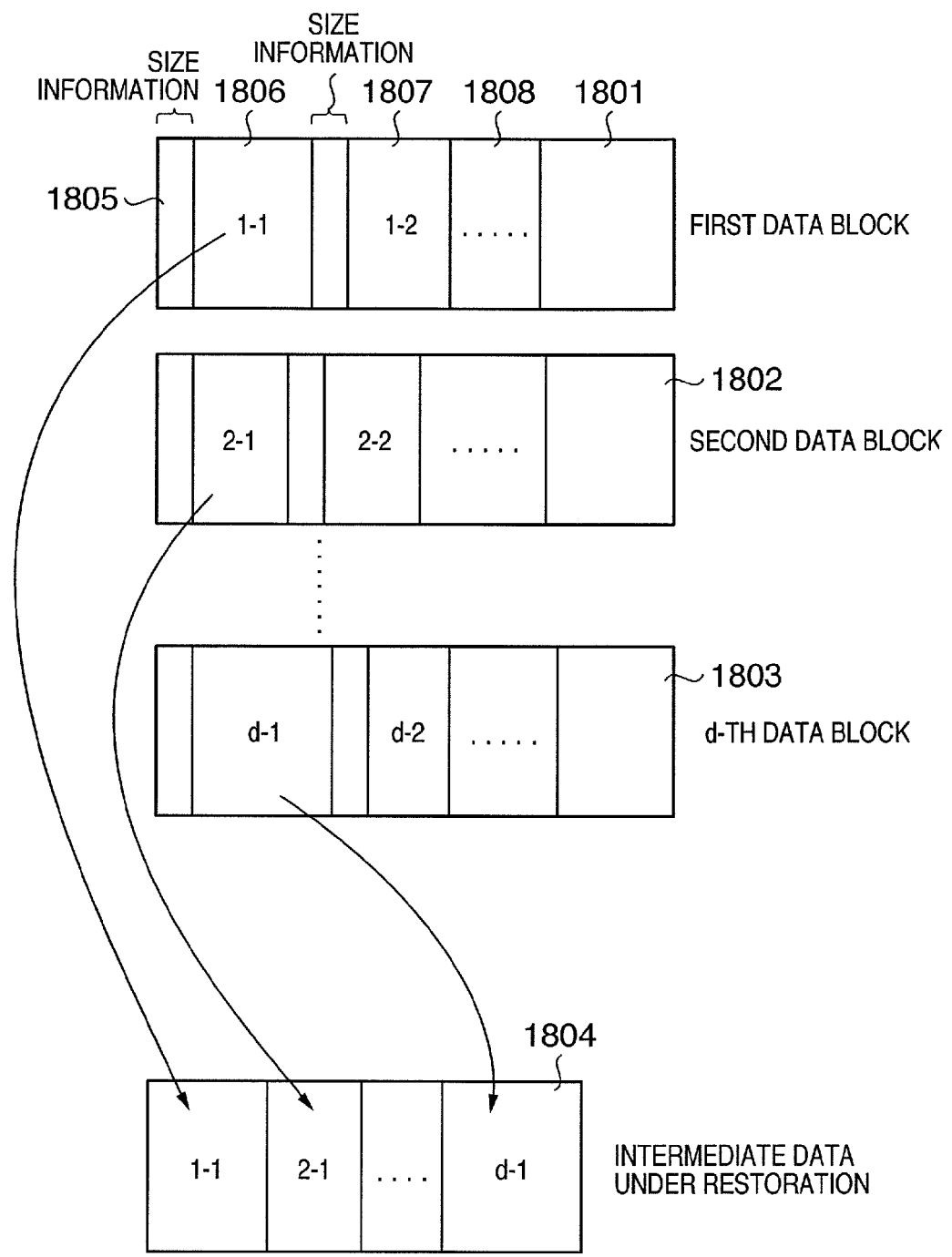
FIGS. 18A and 18B are diagrams illustrating an example of a restoration method for the data distribution processing system according to the first embodiment of the present invention.
Figure 18B:
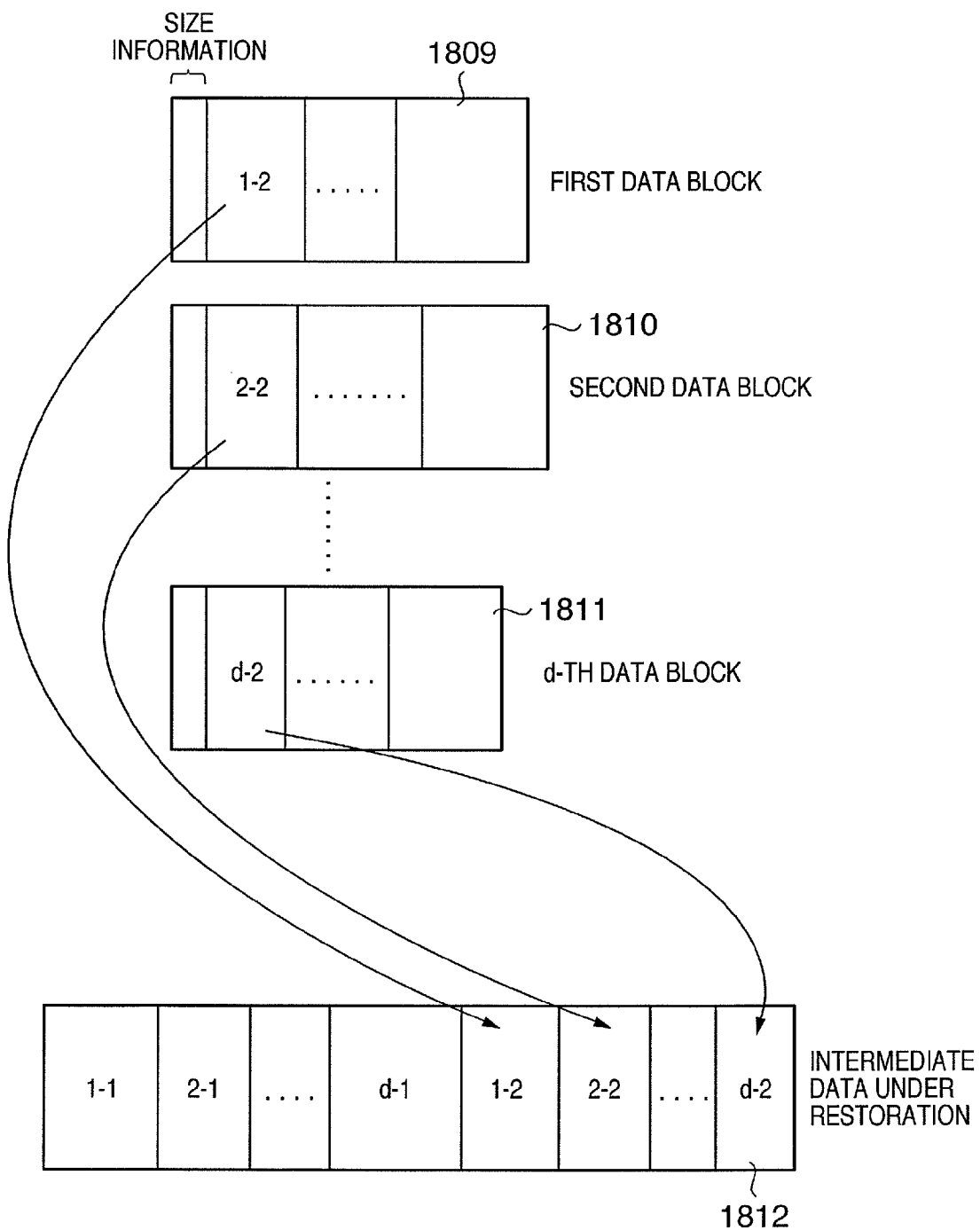

The process is shown in the flowchart in FIG. 17. FIG. 17 is a flowchart illustrating how split data is restored in the data distribution processing system according to the first embodiment of the present invention, where "original" is a variable used to store data to be restored and "data" is a variable used to temporarily store data extracted from data blocks. Tail (a, b) is a function used to connect "b" to the end of "a". It is assumed that the original data is restored from data blocks in a total number of "total".

Figure 9A:
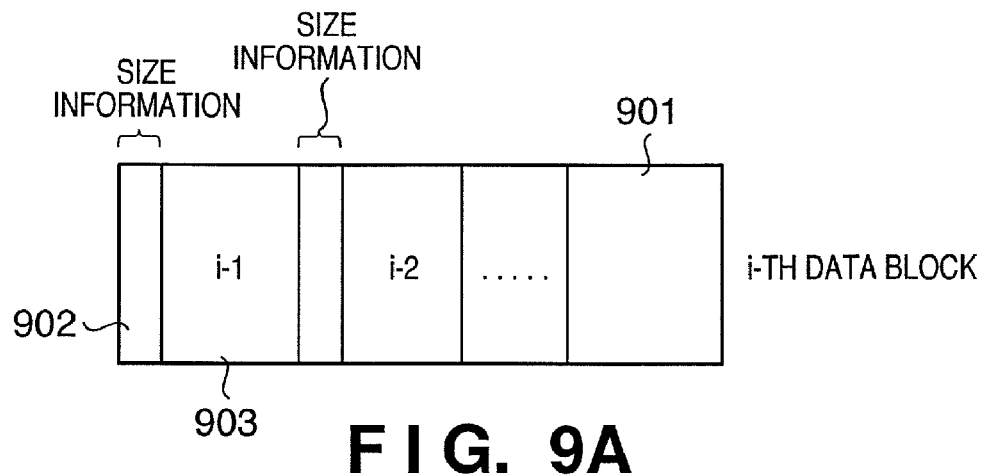
FIGS. 9A to 9C are diagrams showing an exemplary internal structure of the split data according to the first embodiment of the present invention.
Figure 9B:
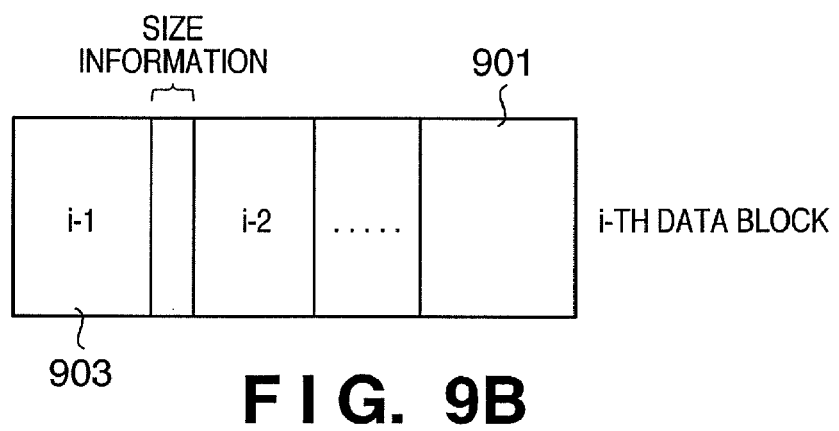
Figure 9C:
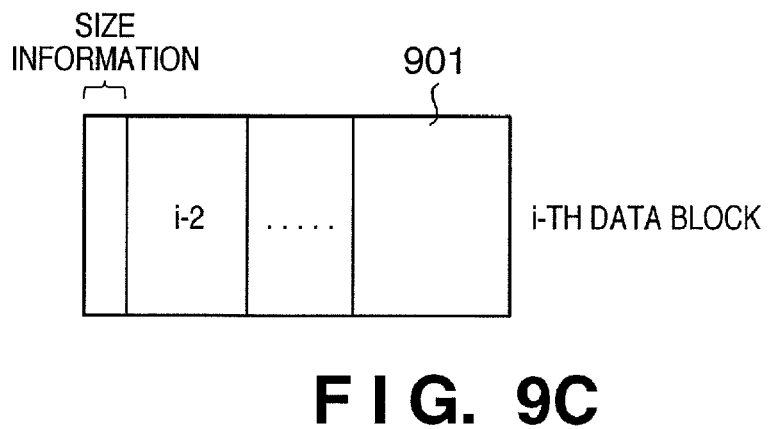

In Step S1701, "original" is emptied. In Step S1702, "1" is assigned to "i". In Step S1703, it is checked whether the i-th data block exists. If there is no i-th data block (No), the flow goes to Step S1707. If the i-th data block exists, the flow goes to Step S1704, where the leading 4 bytes are read and removed from the i-th data block. Specifically, the size information (920) is removed from the head of the i-th data block (901) in FIG. 9A, leaving the i-th data block in the state shown in FIG. 9B. Corresponding components in FIGS. 9A to 9C are denoted by the same reference numerals. Thus, FIGS. 9A to 9C are diagrams showing an exemplary internal structure of the split data according to the first embodiment of the present invention.

In Step S1705, the part specified by the size information read in Step S1704 is cut from the head of the i-th data block and stored in "data". Item 903 is removed from the i-th data block in FIG. 9B, leaving the i-th data block in the state shown in FIG. 9C. In Step S1706, Tail (original, data) is executed to connect "data" to the end of "original". In Step S1707, "i" is incremented by 1. In Step S1707, it is checked whether "i" exceeds "total". If "total" it not exceeded (No), the flow returns to Step S1703. If "total" is exceeded (Yes), the flow goes to Step S1709. In Step S1709, it is checked whether all the data blocks are empty. If not all the data blocks are empty (No), the flow returns to Step S1702. On the other hand, if all the data blocks are empty (Yes), the flow comes to an end. This is only an example of a data reconstruction method, and it goes without saying that another method may be used.

Although scanned data has been described in this example, the division/delivery process and output process described in this example may be used for application data transmitted to a copier (device) from a personal computer or the like. Alternatively, the processes may be used for data stored on a hard disk or the like already connected to a copier (device).

To enhance security, data blocks may naturally be encrypted. Alternatively, a group of data blocks (e.g., 809 in FIG. 8B) may be encrypted. Needless to say both individual data blocks and the group of the data blocks may be encrypted. The information to be encrypted may be included in either restoration information in a bar code, IC card, or the like or an authentication system used for authentication on copiers.

The data thus restored is outputted from a copier (device). As described so far, information printed as a bar code, information stored in an IC card, or other information is needed in order to split data randomly, store the split data in random devices, and restore the original data. Also, by specifying an output device (target device), it is possible to allow only the specified device to restore data. Furthermore, by specifying valid hours for output, it is possible to transfer and output data in a highly secure manner, allowing output only in a specific period.

Also, although copiers have been cited in this example, it goes without saying that the present invention is not limited to copiers as long as the configuration shown in FIG. 1 is used. The configuration does not need to be exactly the same as the one shown in FIG. 1, some addition, deletion, or modification may be made if necessary in order to carry out the present invention. For example, a printer driver can be provided with a function to distribute split data to final output destinations. If data is printed from an application on a personal computer using the printer driver, split data can be delivered from the personal computer without the document scanning illustrated in this example. Furthermore, although recipients of split data are copiers in this example, recipients are not limited to copiers and may be personal computers, servers, or the like. That is, recipients may be any equipment as long as it is equipped with a storage device (such as a hard disk) capable of storing split data as well as with functions to transmit split data or dummy data in response to a request and delete the split data after a specified period. Besides, the data may be deleted not only after a specified period, but also automatically after collection of the data, at a delete command from the user, or at a delete command issued automatically after successful reconstruction of the original data.

Second Embodiment

Now description will be given of another example of the present invention which multiplexes distribution destinations of split data so that data can be acquired from an alternative copier (device) even if split data cannot be acquired due to failure of a copier (device), network trouble, or the like.

Figure 19:
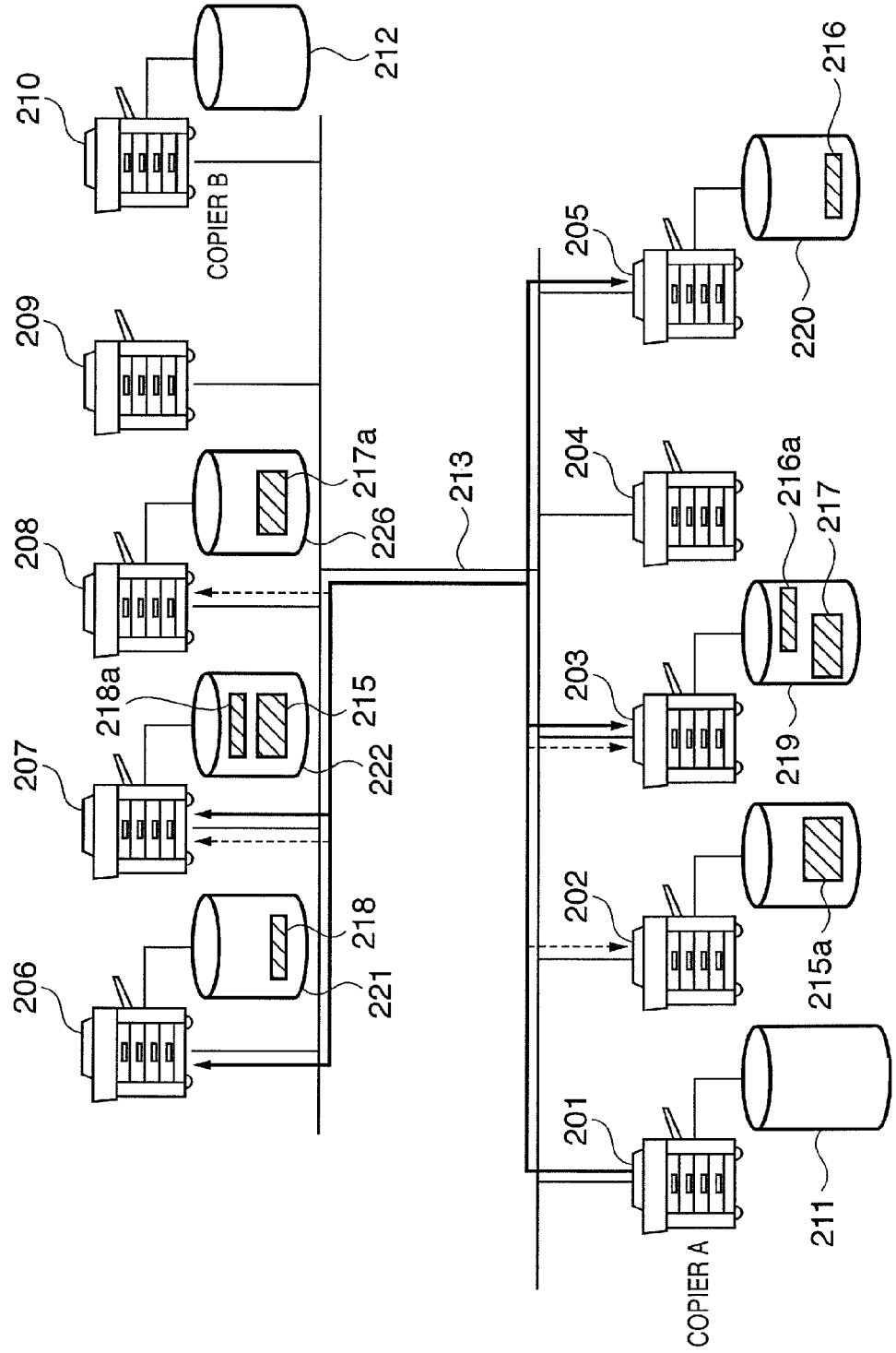
FIG. 19 is an explanatory diagram illustrating an example of how data blocks are multiplexed and distributed in a data distribution processing system according to the second embodiment of the present invention.

FIG. 19 is an explanatory diagram illustrating an example of how data blocks are multiplexed and distributed in a data distribution processing system according to the second embodiment of the present invention. In FIG. 19, multiplexed data is suffixed with "a" such as "215a". FIG. 19 corresponds to FIG. 2C and components equivalent to those in FIG. 2C are denoted by the same reference numerals as corresponding components in FIG. 2C. In FIG. 19, data blocks are distributed in a multiplexed fashion. For example, in FIG. 19, the data block 215 delivered only to the copier 207 in FIG. 2C is delivered not only to the copier 207, but also to a copier 202. Also, in FIG. 19, the data block 216 delivered only to the copier 205 in FIG. 2C is also delivered to the copier 203. The copier 203 also receives the data block 217. In this way, in multiplexed distribution, two or more different data blocks may be delivered to the same device.

However, collecting large quantities of data on a single copier (device) makes it easier to guess the original data. Thus, it is conceivable to allow delivery of only a single data block to each copier (device). Alternatively, an upper limit may be set on the number of partitions which can be delivered to a single copier (device), disabling deliveries in excess of this number. The data block 218 is distributed to the copiers 206 and 207 while the copier 207 also receives delivery of the data block 217. Besides, although in FIG. 19, distribution is duplexed, it goes without saying that distribution may be further multiplexed. Also, to allow for copier failures, it is preferable that in duplex distribution the same data is distributed to different copiers.

Figure 21:
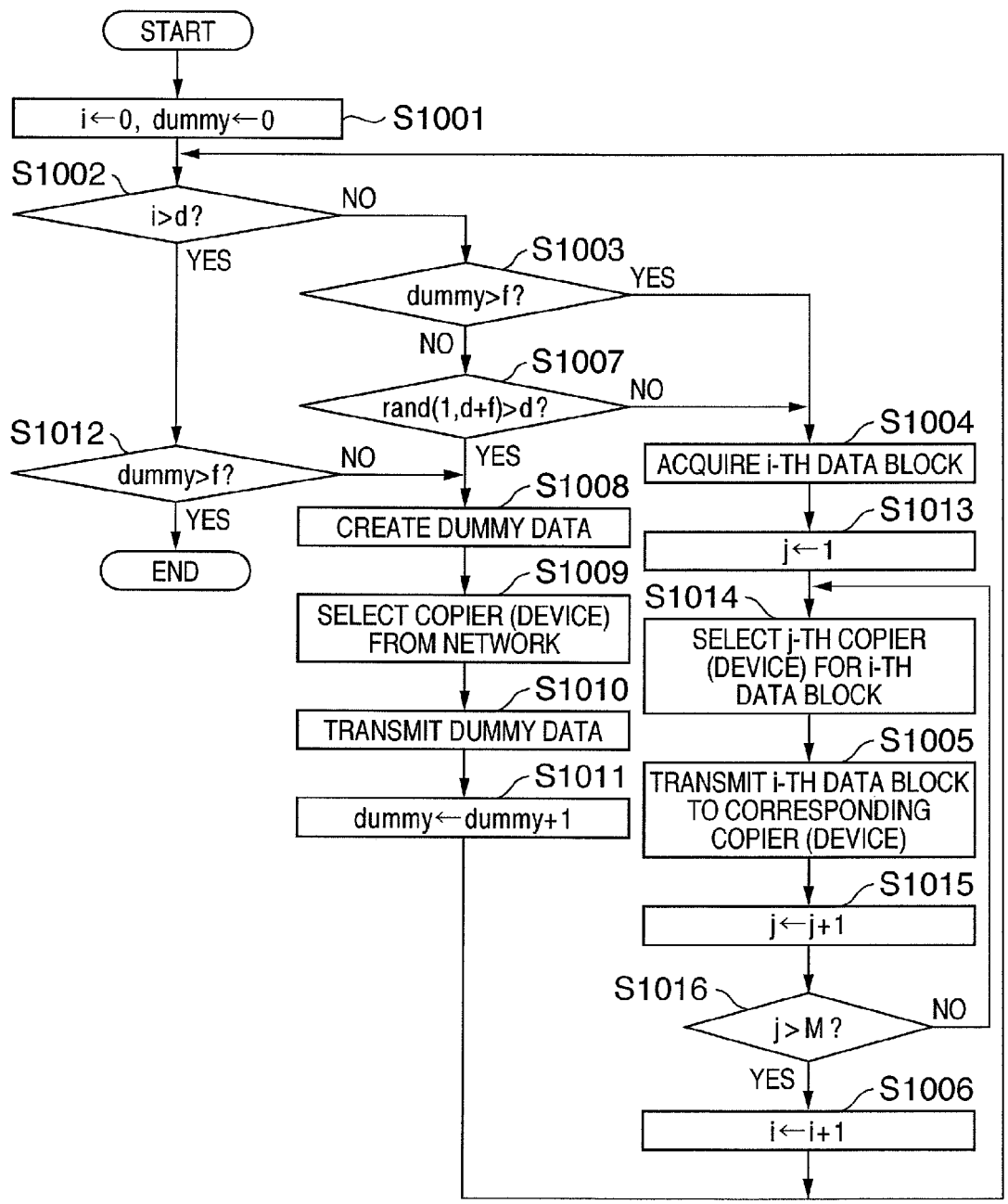
FIG. 21 is a flowchart illustrating the process of distributing multiplexed data in the data distribution processing system according to the second embodiment of the present invention.

FIG. 21 is a flowchart illustrating the process of distributing multiplexed data in the data distribution processing system according to the second embodiment of the present invention. The process shown in FIG. 21 is almost the same as that of the flowchart in FIG. 10. The same steps as those in FIG. 10 are denoted by the same step numbers as corresponding steps in FIG. 10. Differences (Steps S1004 to S1006) from the first embodiment will be described with reference to FIG. 21. The rest is the same as FIG. 10.

First, in Step S1004, the i-th data block is acquired. In Step S1013, "1" is assigned to "i". Let M denotes the numbers of devices to which data blocks are distributed in a multiplexed fashion. In Step S1014, the j-th copier (device) which corresponds to the i-th data block is selected. Step S1014 involves selecting distribution destinations (devices) to distribute the same data block to multiple devices. As described with reference to FIG. 19, arrangements may be made so that the same device will not receive more than one delivery or that different data blocks can be delivered to the same device up to a certain limit. In Step S1005, the i-th data block is transmitted to the copier (device) selected in Step S1004.

In Step S1015, "j" is incremented by 1, and the flow goes to Step S1016. In Step S1016, it is determined whether "j" is really larger than M. In other words, it is determined whether the data blocks have been distributed as many times as the specified number of multiplexed deliveries. If Step S1016 produces a "false" (No) answer, the flow returns to Step S1014 to deliver the same data block to another copier (device). On the other hand, if Step S1016 produces a "true" (Yes) answer, the flow goes to Step S1006 to increment "j" by 1, and then returns to Step S1002.

Now, description will be given of data recorded in a bar code or IC card when multiplexed data blocks are distributed. FIG. 20 is a diagram showing an example of restoration information when data blocks are multiplexed in the data distribution processing system according to the second embodiment of the present invention. That is, FIG. 20 shows data which is recorded in a bar code or IC card and corresponds to the data in FIG. 13. In FIG. 20, sections similar to those in FIG. 10 are denoted by the same section numbers as corresponding sections in FIG. 13 and description thereof will be omitted. A difference lies in section 1303 which indicates devices to which data blocks are transmitted.

In addition to the information shown in FIG. 13, the information in FIG. 20 includes information denoted by 2001, 2002, 2003, and 2004. For example, the first data block to be combined is delivered at an IP address of 192.168.2.3 and stored under a document mane of "xxxyy" in a directory named "¥userX¥184251" in the given copier (device). The second data block described in line 2001 is delivered at an IP address of 192.168.8.56 and stored under a document mane of "abbde" in a directory named "¥userX¥18534535" in the given copier (device). The second data block is used as an alternative when the first data block is not available for use.

Although an IP address is used in FIG. 20 to specify a device as in the case of FIG. 13, an ID or name may be used instead as long as it can identify a device uniquely. Lines 2002, 2003, and 2004 describe destinations of the second data block.

Figure 22:
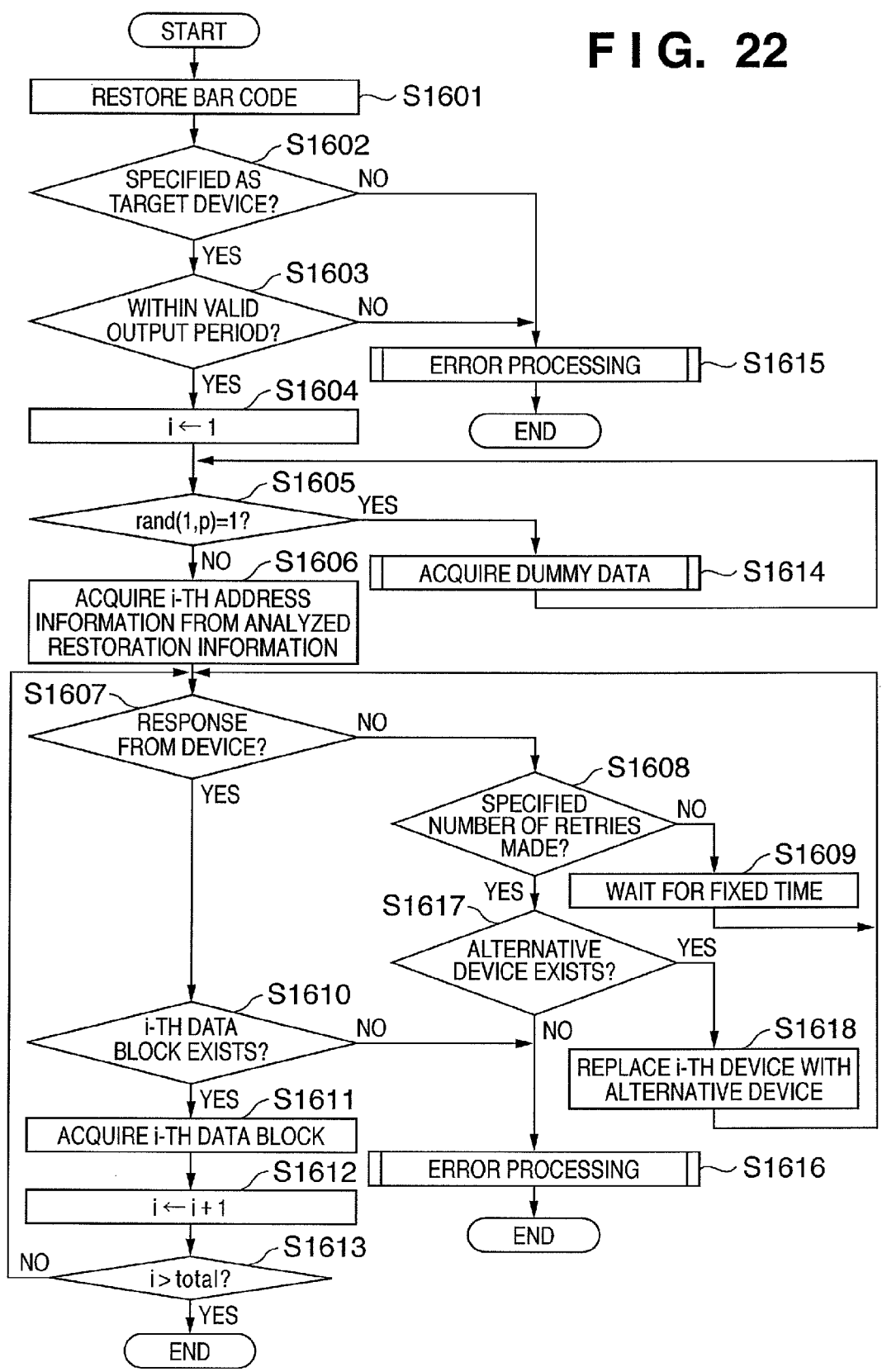
FIG. 22 is a flowchart illustrating the process of acquiring multiplexed data in the data distribution processing system according to the second embodiment of the present invention.

Now, collection of multiplexed data blocks will be described with reference to a flowchart in FIG. 22. FIG. 22 is a flowchart illustrating the process of acquiring multiplexed data in the data distribution processing system according to the second embodiment of the present invention. The flowchart in FIG. 22 corresponds to the flowchart in FIG. 16. The same operations as those in FIG. 16 are denoted by the same step numbers as corresponding operations in FIG. 16 and only differences will be described in this example. Specifically, Steps S1617 and S1618 have been added.

In Step S1607, it is checked whether the device selected for delivery of the data block responds. If the device responds (Yes), the flow goes to Step S1610 to perform the same process as in FIG. 16 using this device. If the device does not respond (No), it is likely that the device is engaged in another process, is in sleep mode, is out of order, or the like. Consequently, the flow goes to Step S1608 to check whether a specified number of retries have been made. If the specified number of retries have not been made yet (No), the flow waits in Step S1609 for a fixed period of time and returns to Step S1607 to check again whether the device responds. If it is found in Step S1608 that the specified number of retries have been made, the flow goes to Step S1617 to check for another alternative device.

For example, in FIG. 20, it is checked whether recipients (2001 to 2004) of the second data block exist. If all alternative devices have been tried or if there is no alternative device, the flow goes to Step S1616 to perform error processing and then comes to an end. On the other hand, if there are alternative devices yet to be tried, the flow goes to Step S1618. In Step S1618, one of the remaining alternative devices is selected for the i-th data block. After that, the flow returns to Step S1607 to check for a response again.

In this way, by multiplexing recipients, it is possible to increase the possibility of data restoration even if a device does not respond due to failure, network trouble, or the like. The user may be allowed to select either of two methods: a method of collecting one data block out of each set of multiplexed data blocks and a method of collecting all the data blocks out of each set of multiplexed data blocks.

Third Embodiment

Now, description will be given of another example in which restoration information in a bar code, IC card, or the like on an output destination copier (device) is lost or otherwise missing. In this example, it is assumed that copiers are equipped with a fax machine. An example is a configuration in which the unit controller 110 in FIG. 1 is connected with a fax machine.

Figure 23:
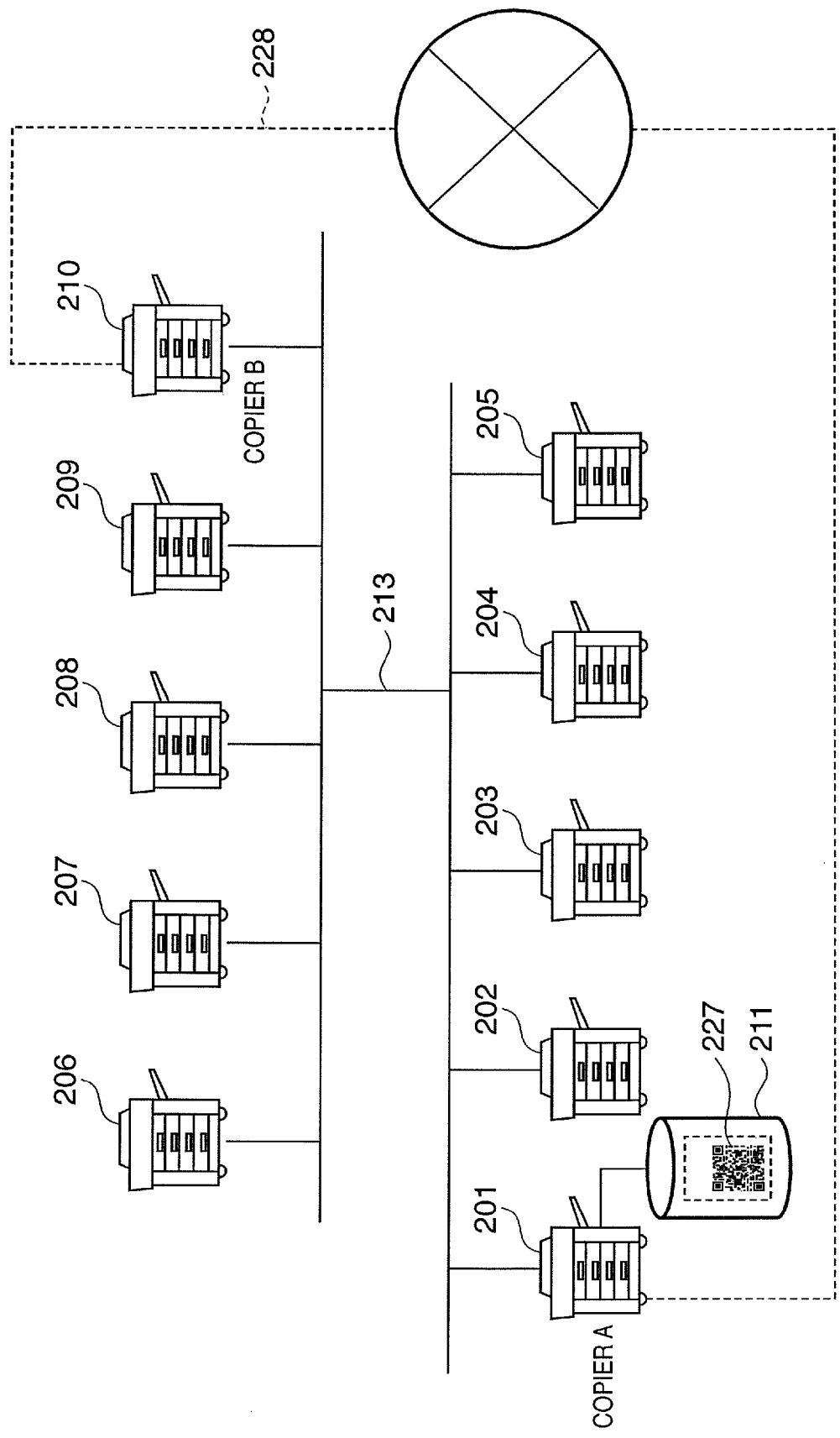
FIG. 23 is a flowchart illustrating processes carried out when copiers in a data distribution processing system according to the third embodiment of the present invention are connected via a public network.

FIG. 23 is a flowchart illustrating processes carried out when copiers in a data distribution processing system according to the third embodiment of the present invention are connected via a public network. According to the first embodiment, when a document is scanned by the copier 201, the resulting data is outputted as a bar code or inputted in an IC card while data on restoration information is deleted.

On the other hand, according to this example, when data is outputted as a bar code or inputted in an IC card, the data on restoration information is stored in an area inaccessible outside the storage device instead of being discarded. Specifically, the restoration data is stored in a special area 227 provided in the storage device 211 of the copier 201. A password for use to acquire the data and information for use to identify the user are stored at the same time. Another mechanism including a biometric authentication technique such as fingerprint recognition may be used instead of the password as long as it can identify the user who has stored the data.

Although in FIG. 23, a special area which cannot be accessed (is prohibited from being accessed) from outside is provided in a hard disk, a separate storage device such as hard disk which cannot be accessed from outside may be connected alternatively. Although details are omitted, it is assumed that output destination copiers (devices), output hours of copiers, and other settings are described in the same sections as those of examples 1 and 2.

In FIG. 23, copier A (201) and copier B (210) are connected via a public network 228 such as a public switched telephone network. If copier B (210) does not have restoration information, copier B (210) places a FAX call to copier A (201). At this time, it is assumed that a common authentication server or the like on the network checks user authentication although not illustrated in the figure. Resulting authentication information and user identification information such as a password are sent together to copier A (201) via the network 213. Upon receiving the FAX call, copier A (201) receives phone number information from the public network 228 and checks whether it is a call from copier B (210). The check is made using a telephone directory contained in copier A (201) or information from a directory server or the like which manages information.

If it is found that the call is from copier B (210), copier A (201) further checks the authentication information, password, and the like sent together. If the checks are completed successfully, copier A (201) transmits the restoration information in the form of a two-dimensional bar code to copier B (210) by FAX via a public network 228. The copier B (210) may print the received restoration information such as the two-dimensional bar code first. Alternatively, copier B (210) may begin an analysis process which corresponds to Step S602 in FIG. 6 and thereby start data reconstruction without printing the restoration information.

If restoration information can be retrieved by FAX or the like via a network (public network) in this way, it is possible to restore data even if the restoration information is lost or forgotten.

According to the examples described above, the original data is split into multiple data blocks, mixed with dummy data blocks, and transferred to specified devices in a distributed manner. This increases security of outputs to devices on the network. That is, security can be increased by making it extremely difficult for a third party to reconstruct data even if the data is monitored when it is outputted from the copier which distributes the data or when it is inputted in the copier which reconstructs the data.

Examples of an embodiment have been described so far, but the present invention can also be embodied, for example, as a system, apparatus, method, program, or storage medium (recording medium). Specifically, the present invention may be applied to a system composed of two or more devices as well as to apparatus composed of a single device.

The present invention is also achieved when program code of software programs (programs which correspond to the illustrated flowcharts according to the embodiment) which implement the functions of the above embodiment is supplied directly or remotely to a system or apparatus and read out and executed by a computer of the system or apparatus.

Thus, the program code itself installed on the computer to implement functions and processes of the present invention on the computer also implements the present invention. That is, the present invention also includes the computer programs which implement the functions and processes of the present invention.

In that case, the program code may take any form including object code, programs executed by an interpreter, and script data supplied to an OS as long as it has program functions.

Recording media available for use to supply programs include, for example, floppy™ disks, hard disks, optical disks, magneto-optical optical disks, CD-ROM, CD-R, CD-RW, magnetic tape, non-volatile memory cards, ROM, DVD (DVD-ROM and DVD-R), etc.

The program can also be supplied by being downloaded from an Internet homepage using a browser on a client computer onto a recording medium such as a hard disk. That is, it is obtained by connecting to an Internet homepage and downloading the computer program itself of the present invention or a compressed self-installing file from the homepage. Also, the program code of the program according to the present invention may be divided into multiple files, which can be downloaded from respective homepages. That is, the present invention also includes WWW servers which allow multiple users to download program files capable of implementing the functions and processes of the present invention on a computer.

The present invention can also be implemented by supplying users with a storage medium such as a CD-ROM containing the program of the present invention in encrypted form, providing key information for decryption to the user who satisfies predetermined conditions through a download from an Internet homepage, and allowing the user to decrypt and install the program on a computer using the key information.

The functions of the above embodiment may be implemented not only by the program read out and executed by the computer, but also by part or all of the actual processing executed, in accordance with instructions from the program, by an OS running on the computer.

Furthermore, the functions of the above embodiment may also be implemented by part or all of the actual processing executed by a CPU or the like contained in a function expansion board inserted in the computer or a function expansion unit connected to the computer if the processing is performed in accordance with instructions from the programs that have been read out of the recording medium and written into memory on the function expansion board or unit.

The present invention makes it extremely difficult for a third party to restore original data even if split data flowing through a network is intercepted by the third party during transmission or reception.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-262981 filed on Sep. 9, 2005, which is hereby incorporated by reference herein in its entirety.

What is claimed is:

1. A data distribution processing system including a plurality of apparatuses which are interconnected via a network and are capable of data communications,
   wherein a first apparatus of the plurality of apparatuses comprises:
   (a) a data acquisition unit adapted to acquire data to be outputted to a second apparatus of the plurality of apparatuses,
   (b) a determination unit adapted to determine a plurality of recipients of the plurality of apparatuses,
   (c) a splitting unit adapted to split the acquired data into a plurality of data blocks,
   (d) a generation unit adapted to generate dummy data which is delivered separately from the plurality of data blocks split by the splitting unit, wherein the dummy data does not include the acquired data at all, or in part,
   (e) a delivery unit adapted to deliver each of the plurality of data blocks to a different one of the plurality of recipients determined by said determination unit, and deliver the dummy data to an apparatus other than the plurality of recipients determined by said determination unit,
   (f) an output unit adapted to output restoration information including information about the plurality of recipients and information for reconstruction of the data, and
   (g) a specifying unit adapted to specify a second apparatus which recombines the plurality of data blocks into data ready for output,
   wherein the second apparatus of the plurality of apparatuses comprises:
   (a) an information acquisition unit adapted to acquire the restoration information outputted by the output unit,
   (b) a collection unit adapted
      (1) to collect the plurality of data blocks and the dummy data from the apparatuses to which the plurality of data blocks and the dummy data were delivered, based on the restoration information or
      (2) to collect the plurality of data blocks from the plurality of recipients, based on the restoration information, (c) a reconstruction unit adapted to reconstruct the data split by the splitting unit, using each of the plurality of data blocks collected by the collection unit based on the restoration information, and (d) a checking unit which checks whether the second apparatus is the apparatus identified by the restoration information and permitted to reconstruct data, wherein the output unit generates and outputs restoration information including information for use to identify the plurality of recipients and information for use to identify the second apparatus which collects data blocks from the plurality of recipients and permits data reconstruction, and wherein the second apparatus reconstructs a single set of data from the plurality of data blocks if the checking unit confirms that the second apparatus is the apparatus permitted to reconstruct data.

2. The data distribution processing system according to claim 1, wherein the determination unit determines the plurality of recipients randomly among the plurality of apparatuses on the network.

3. The data distribution processing system according to claim 1, further comprising:
a date/time specifying unit which specifies a date and time when the data can be outputted; and
a time checking unit which checks the current date and time,
wherein the second apparatus can output the data only within a time specified by the date/time specifying unit.

4. The data distribution processing system according to claim 3, wherein the plurality of data blocks are deleted when the date and time specified by the date/time specifying unit expires.

5. The data distribution processing system according to claim 3, wherein the second apparatus outputs dummy data when the data is outputted outside the date and time specified by the date/time specifying unit.

6. The data distribution processing system according to claim 3, further comprising a time server equipped with the time checking unit.

7. The data distribution processing system according to claim 1, wherein the splitting unit splits the data into data blocks of random sizes.

8. The data distribution processing system according to claim 1, wherein the restoration information outputted by the output unit is described as a bar code.

9. The data distribution processing system according to claim 1, wherein the output unit writes the restoration information into an IC card.

10. The data distribution processing system according to claim 1, wherein the output unit outputs the restoration information in encrypted form.

11. The data distribution processing system according to claim 1, wherein the splitting unit, the determination unit, the specifying unit, and the output unit are implemented by a printer driver of the first apparatus.

12. The data distribution processing system according to claim 1, wherein the delivery unit delivers the plurality of data blocks to the plurality of recipients in a multiplexed fashion.

13. The data distribution processing system according to claim 1, wherein the first apparatus further comprises:
(a) a restoration information backup unit which stores the restoration information outputted by the output unit in a predetermined storage device which denies external access,
(b) a facsimile unit which conducts facsimile communications,
(c) a phone number acquisition unit which acquires a phone number to which a call is made via facsimile communications, and (d) an address acquisition unit which acquires address information from an address book which associates devices with phone numbers used for facsimile communications, and wherein the facsimile unit transmits the restoration information stored in the storage device by the restoration information backup unit to the second apparatus if address information about the second apparatus specified by the specifying unit, as acquired by the address acquisition unit, matches a phone number acquired by the phone number acquisition unit.

14. A data distribution processing method for a data distribution processing system including a plurality of apparatuses which are interconnected via a network and are capable of data communications,
wherein the method comprises, in a first apparatus of the plurality of apparatuses, the steps of:
(a) acquiring data to be outputted to a second apparatus of the plurality of apparatuses,
(b) determining a plurality of recipients of the plurality of apparatuses,
(c) splitting the acquired data into a plurality of data blocks,
(d) generating dummy data which is delivered separately from the plurality of data blocks split in the splitting step, wherein the dummy data does not include the acquired data at all, or in part,
(e) delivering each of the plurality of data blocks to a different one of the plurality of recipients and delivering the dummy data to an apparatus other than the plurality of recipients determined in the determining step,
(f) outputting restoration information including information about the plurality of recipients and information for reconstruction of the data, and
(g) specifying a second apparatus which recombines the plurality of data blocks into data ready for output,
wherein the method comprises, in the second apparatus of the plurality of apparatuses, the steps of:
(a) acquiring the restoration information,
(b) collecting the plurality of data blocks and the dummy data from the apparatuses to which the plurality of data blocks and the dummy data were delivered, based on the restoration information, or collecting the plurality of data blocks from the plurality of recipients, based on the restoration information,
(c) reconstructing the split data using each of the plurality of data blocks based on the restoration information, and
(d) checking whether the second apparatus is the apparatus identified by the restoration information and permitted to reconstruct data,
wherein the outputting step generates and outputs restoration information including information for use to identify the plurality of recipients and information for use to identify the second apparatus which collects data blocks from the plurality of recipients and permits data reconstruction, and
wherein the second apparatus reconstructs a single set of data from the plurality of data blocks if the checking step confirms that the second apparatus is the apparatus permitted to reconstruct data.

15. A non-transitory computer-readable recording medium storing a program which makes a computer execute the data distribution processing method according to claim 14.

* * * * *